United States Patent
Ward

(10) Patent No.: US 10,991,281 B2
(45) Date of Patent: Apr. 27, 2021

(54) APPARATUS AND METHOD FOR ENCODING HIGH FRAME RATE CONTENT IN STANDARD FRAME RATE VIDEO USING TEMPORAL INTERLACING

(71) Applicant: Dolby Laboratories Licensing Corporation, San Francisco, CA (US)

(72) Inventor: Gregory John Ward, Berkeley, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 16/078,490

(22) PCT Filed: Feb. 16, 2017

(86) PCT No.: PCT/US2017/018046
§ 371 (c)(1),
(2) Date: Aug. 21, 2018

(87) PCT Pub. No.: WO2017/146972
PCT Pub. Date: Aug. 31, 2017

(65) Prior Publication Data
US 2019/0088178 A1    Mar. 21, 2019

Related U.S. Application Data

(60) Provisional application No. 62/449,804, filed on Jan. 24, 2017, provisional application No. 62/298,085, filed on Feb. 22, 2016.

(30) Foreign Application Priority Data

Feb. 22, 2016   (EP) ..................... 16156756

(51) Int. Cl.
*G09G 3/00*    (2006.01)
*H04N 5/232*    (2006.01)
(Continued)

(52) U.S. Cl.
CPC ............. *G09G 3/005* (2013.01); *G06T 5/003* (2013.01); *G06T 5/50* (2013.01); *G09G 3/007* (2013.01);
(Continued)

(58) Field of Classification Search
CPC .. H04N 5/345; H04N 5/2355; H04N 5/35581; H04N 5/2327; G06T 5/003;
(Continued)

(56) References Cited

U.S. PATENT DOCUMENTS 8,508,608 B2   8/2013   Bub
8,605,185 B2   12/2013  Border
(Continued)

FOREIGN PATENT DOCUMENTS

WO    2008/138543    11/2008

OTHER PUBLICATIONS

Mihir, M. et al., "Flexible wide dynamic range (WDR) Processing support in image signal processor (ISP)", 2015 IEEE International conference on consumer electronics (ICCE), IEEE, Jan. 9, 2015, pp. 467-470.
(Continued)

*Primary Examiner* — Christopher E Leiby

(57) ABSTRACT

An imaging system, comprising a pixel image sensor array disposed on a substrate and comprising a plurality of pixels, a multi-stage timer coupled to said pixel image sensor array for triggering exposures of said pixels, wherein the pixels are grouped into N subsets, and the timer triggers, for each subset, a sequence of at least two exposures of different capture duration of the pixels of said subset, wherein start times of the exposure sequences of the different subsets are temporally offset, at least one ADC coupled to said pixel image sensor array, which converts said exposures of said pixels to pixel digital values, a memory coupled to said at
(Continued)

least one ADC to store said pixel digital values, and a logic circuit coupled to said memory to determine for each pixel of the image sensor array which of the corresponding stored pixel digital values to upload to a video frame.

16 Claims, 20 Drawing Sheets

(51) Int. Cl.
*H04N 5/355* (2011.01)
*H04N 5/235* (2006.01)
*G06T 5/50* (2006.01)
*G06T 5/00* (2006.01)

(52) U.S. Cl.
CPC ......... *H04N 5/2327* (2013.01); *H04N 5/2353* (2013.01); *H04N 5/2355* (2013.01); *H04N 5/35581* (2013.01); *G06T 2207/20208* (2013.01); *G06T 2207/20221* (2013.01); *G09G 2320/0252* (2013.01); *G09G 2320/0261* (2013.01); *G09G 2340/0435* (2013.01)

(58) Field of Classification Search
CPC .......... G06T 7/20; G09G 3/005; G09G 3/007; G09G 2320/0252; G09G 2320/0261; G09G 2340/0435
See application file for complete search history.

(56) References Cited

U.S. PATENT DOCUMENTS

| | | | |
|---|---|---|---|
| 8,917,330 B1* | 12/2014 | Campbell | H04N 5/23232 348/229.1 |
| 8,958,649 B2 | 2/2015 | Zhang | |
| 2004/0069928 A1 | 4/2004 | Sagatelyan | |
| 2009/0040364 A1* | 2/2009 | Rubner | G06T 3/4053 348/362 |
| 2010/0201799 A1* | 8/2010 | Mohrholz | A61B 3/12 348/78 |
| 2010/0265370 A1* | 10/2010 | Kumar | G06T 3/4015 348/280 |
| 2012/0044381 A1* | 2/2012 | Jannard | H04N 5/235 348/229.1 |
| 2015/0070569 A1 | 3/2015 | Blayvas | |
| 2015/0207974 A1* | 7/2015 | Mody | H04N 5/345 348/296 |
| 2015/0350514 A1* | 12/2015 | Zhai | H04N 5/2355 348/222.1 |
| 2017/0064237 A1* | 3/2017 | Aibara | H04N 5/378 |
| 2017/0142353 A1* | 5/2017 | Tadmor | H04N 5/23245 |

OTHER PUBLICATIONS

Gupta, M.A. et al "Flexible Voxels for Motion-Aware Videography", European Conference on Computer Vision, 2010.

Sugawa, S. et al "A 100dB Dynamic Range CMOS Image Sensor Using a Lateral Overflow Integration Capacitor" ISSCC Dig. Tech. Paper,pp. 352, Feb. 2005.

* cited by examiner

| 4 | 12 | 6 | 11 |
|---|----|---|----|
| 15 | 2 | 14 | 7 |
| 9 | 13 | 10 | 3 |
| 1 | 5 | 0 | 8 |

Fig. 2

APPARATUS AND METHOD FOR ENCODING HIGH FRAME RATE CONTENT IN STANDARD FRAME RATE VIDEO USING TEMPORAL INTERLACING

CROSS REFERENCE TO RELATED APPLICATIONS

This application claims the benefit of priority to U.S. Provisional Application Ser. No. 62/449,804, filed on Jan. 24, 2017, and Ser. No. 62/298,085, filed on Feb. 22, 2016, and to EP Application Ser. No. 16156756.5, filed on Feb. 22, 2016, which are incorporated herein by reference in their entirety.

TECHNICAL FIELD

The present disclosure relates to capturing and encoding video frames and more specifically to capture and encode high frame rate content and transport it in a standard frame rate video.

BACKGROUND

Moving pictures (movies) are an optical trick in which a number of individual still pictures are flashed at a rate faster than the human eye can individually distinguish them as individual photos. The faster the pictures are flashed, the smoother motion appears, but not without cost. This speed of exposure comes at the cost of resolution of the individual pictures due to less photons being captured by the sensor media, and simultaneously, the greater the cost of transport. The slower the speed of exposure, the greater the detail that is captured within the individual picture, but this occurs at the expense of blurred motion. Thus, with a single speed of exposure there is an uneasy balance of detail versus the accurate capturing of motion.

SUMMARY OF THE INVENTION

In one embodiment an imaging system comprises a pixel image sensor array disposed on a substrate, said pixel image sensor array comprising a plurality of pixels. The imaging system further comprises a multi-stage timer coupled to said pixel image sensor array for triggering exposures of said plurality of pixels, wherein the pixels are grouped into N subsets, and the multi-stage timer is configured to trigger, for each of the N subsets, an exposure sequence of at least two exposures of different capture duration of the pixels of said subset, wherein start times of the exposure sequences of the different subsets are temporally offset by a predetermined offset $t_{offset}$, and the sequences have the same overall duration T and the predetermined temporal offset $t_{offset}$ is smaller than said overall duration T. The imaging system further comprises at least one analog to digital converter coupled to said pixel image sensor array and configured to convert said at least two exposures of said plurality of pixels of the subsets to pixel digital values, and a memory coupled to said at least one analog to digital converter and configured to store said pixel digital values. The imaging system further comprises a logic circuit coupled to said memory and configured to determine for each pixel of the image sensor array which of the corresponding stored pixel digital values to upload to a video frame.

In other words, the pixels of the pixel image sensor array are assigned to N "trigger groups" for group-wise exposure of the pixels. The exposure sequence is the same for each pixel within a trigger group, while the exposure sequences of different trigger groups are temporally offset, i.e. their start times are temporally offset. The exposure sequences of different trigger groups overlap in time, i.e. their duration is the same and the offset between the start times of the different sequences is smaller than the duration of a sequence.

In one example, the N subsets are defined by subdividing the pixel image sensor array into subarrays of N pixels, and including in each subset a single pixel from each subarray.

In one embodiment, a method of imaging comprises triggering an exposure sequence of at least two exposures of different capture duration of the pixels of each of N subsets of a plurality of pixels of a pixel image sensor array, wherein the exposure sequences are triggered in a predetermined order, wherein start times of the exposure sequences of the different subsets are temporally offset by a predetermined offset $t_{offset}$, and the sequences have the same overall duration T and the predetermined temporal offset $t_{offset}$ is smaller than said overall duration T, converting said at least two exposures of said plurality of pixels of the subsets to pixel digital values, determining for each pixel of the image sensor array which of the corresponding stored pixel digital values to upload to a video frame, and uploading the determined stored pixel digital value to the video frame.

In a further embodiment a method of image processing comprising receiving a first exposure of a first capture duration from a pixel, receiving a second exposure of a second capture duration from the pixel, wherein the second capture duration is less than one half of a temporal length of the first capture duration, converting the first exposure to a first pixel digital value, converting the second exposure to a second pixel digital value, multiplying the second pixel digital value based on a ratio of the first capture duration to the second capture duration, storing the first pixel digital value and the second pixel digital value and selecting one of the first pixel digital value and the second pixel digital value to upload to a video frame.

In yet a further embodiment a method of encoding an image comprises receiving a first pixel digital value of a first exposure of a pixel, the first exposure having a first capture duration, receiving a second pixel digital value of a second exposure of the pixel, the second exposure having a second capture duration is that is smaller than the first capture duration, optionally less than one half of the first capture duration, comparing the first pixel digital value to the second pixel digital value to determine a pixel digital delta and selecting for upload to a video frame the first pixel digital value if the pixel digital delta is less than a first predetermined threshold and/or selecting for upload to the video frame the second pixel digital value if said pixel digital delta exceeds a second predetermined threshold.

In yet another embodiment a method of encoding comprising receiving a first pixel digital value of a first capture duration from a pixel, receiving a second pixel digital value of a second capture duration from the pixel, wherein the second capture duration is less than one half of a temporal length of the first capture duration, multiplying the second pixel digital value based on a ratio of the first capture duration to the second capture duration and selecting one of the first pixel digital value and the second pixel digital value to upload to a video frame based in part on a smooth pursuit vector, wherein the smooth pursuit vector is an estimate of viewer visual tracking.

In another embodiment, a method of encoding comprises receiving a first pixel digital value of a first capture duration from a pixel, receiving a second pixel digital value of a second capture duration from the pixel, wherein the second capture duration is less than one half of a temporal length of the first capture duration, converting the first pixel digital value into a first irradiance, converting the second pixel digital value into a second irradiance, determining a relative irradiance from subtraction of the first irradiance from the second irradiance and selecting the first pixel digital value to upload to a video frame if the absolute value of the relative irradiance is greater than a predetermined threshold.

In another embodiment, a method of encoding comprises receiving a first pixel digital value of a first capture duration from a pixel, receiving a second pixel digital value of a second capture duration from the pixel, wherein the second capture duration is less than one half of a temporal length of the first capture duration, converting the first pixel digital value into a first irradiance, converting the second pixel digital value into a second irradiance, determining a relative irradiance from subtraction of the first irradiance from the second irradiance, mixing the first pixel digital value and the second pixel digital value to form a mixed pixel digital value based on the first irradiance and the second irradiance if the relative irradiance is less than a predetermined threshold and selecting the mixed pixel digital value to upload to a video frame.

In an embodiment a method of decoding comprises receiving encoded video frames having a first pixel resolution, wherein each pixel of the encoded video frames corresponds to one of a plurality of subframes, wherein the correspondence between the pixels and the subframes is defined by a temporal offset matrix, extracting subframes overlapping a target output interval from the encoded video frames using the temporal offset matrix, the subframes having a second pixel resolution, upscaling the extracted subframes to the first pixel resolution, wherein the upscaling preferably comprises spatially interpolating, generating a high temporal resolution image by forming a linear combination of the upscaled subframes, preferably by averaging the upscaled subframes, selecting one of the encoded video frames that overlaps the target output interval as a high spatial resolution image, forming downsampled subframes by downsampling the spatially interpolated subframes to the second pixel resolution, forming a downsampled average frame by downsampling and averaging at least two encoded frames to the second pixel resolution, determining a difference image by a) determining the differences between the downsampled average frame and each of the downsampled subframes, b) determining a norm of each of said differences, and c) determining the sum or the maximum of said normed differences, upsampling the determined difference image to the first pixel resolution, generating an output video frame having the first pixel resolution, wherein for each pixel of the output video frame, the pixel digital value is set to the pixel digital value of the corresponding pixel of the high temporal resolution image if the pixel value of the corresponding pixel of the upsampled difference image exceeds a predetermined threshold, and otherwise the pixel digital value is set to the pixel digital value of the corresponding pixel of the high spatial resolution image.

The norm determined on the basis of the differences may for example be an L1 norm, i.e. a sum of the absolute value of the differences, or an L2 norm, i.e. a sum of the squares of the differences.

In another embodiment, a method of decoding a temporally offset frame comprises interpolating a set of N frames spatially utilizing a set of temporal offset matrix positions corresponding to a target output interval, averaging the N interpolated frames to form a motion image frame, down-sample matching a spatial resolution of each of the N interpolated frames to form a down-sample matched frame, down-sample averaging a set of N original frames utilizing the down-sample matched spatial resolution to form a down-sample averaged frame, determining a set of squared difference values between the down-sample matched frame and the down-sample averaged frame, summing the set of squared difference values to form a summed squared difference frame, up-sampling the summed squared difference frame, resetting the up-sampled summed squared difference values above a predetermined upper threshold to one and below a predetermined lower threshold to zero, determining a mixing image utilizing the reset summed squared difference values, selecting a dominant frame that corresponds to a maximum-overlap with the target output interval and combining the selected dominant frame with the motion image frame based on the mixing image to form an output frame.

Further embodiments relate to an encoder configured to implement any of the encoding methods described above, a decoder configured to implement any of the decoding methods described above and a non-transitory computer-readable storage medium having stored thereon computer-executable instruction for executing an encoding method and/or a decoding method as described above.

DESCRIPTION OF THE DRAWINGS

FIG. 2 is an example temporal offset matrix in accordance with one embodiment of the disclosure.

Like reference numbers and designations in the various drawings indicate like elements.

DETAILED DESCRIPTION OF THE INVENTION

Figure 1:
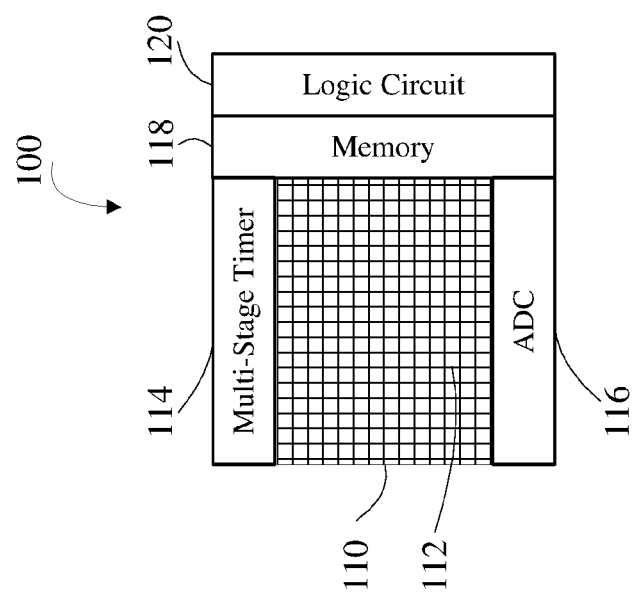
FIG. 1 is an overview of an example system accordance with one embodiment of the disclosure.

Capturing pictures at a high frame-rate is hampered by bandwidth and noise issues. The larger number of pictures captured increases amount of data per second sent down the pipeline thus affecting bandwidth and the higher frame-rates translate to shorter exposure times and increase the noise associated with the picture. High frame-rate video allows a reduction of motion artifacts such as judder and excessive blurring.

Judder occurs when untracked motion is represented by short exposures separated by some time Δt (e.g., using a 30° shutter that is open for 1/12th of the frame time). The moving object flashes one place and then again in a different place, and high-contrast edges or silhouettes appear to flash where their motion should be smooth.

Smooth pursuit describes motion that is of interest to and is tracked by the viewer, which is an estimate of viewer visual tracking and may be quantified by a smooth pursuit vector. To determine the smooth pursuit vector, an eye movement vector is subtracted from a local image motion vector and regions where significant eye and object motion vectors cancel correspond to smooth pursuit. Partially canceling vectors may be used to change the local shutter time proportionally.

Judder artifacts may be avoided by using a more open shutter, a 360° shutter may allow motion to be captured during entire frame duration resulting in smearing the motion and causing excessive blurring. Current video content is a compromise between these shutters extremes, and thus less than optimal.

High frame-rate video overcomes some of these issues by presenting more frames per second than standard video. However, it comes at a cost due to the additional information that is transmitted and displayed. Many LCD displays cannot refresh effectively at more than 120 frames per second (fps), and they get less energy-efficient and photon-efficient at higher refresh rates. Even at 120 fps, which translates to 4-5 times the data bandwidth of standard video, judder and excessive motion blur are apparent in some content. Eliminating judder and blur entails video in excess of 400 fps, which is about 17 times the bandwidth of today's movies.

The instant disclosure may provide a higher perceptible frame rate without the associated cost in bandwidth and display technology. Through an apparatus for image capture, a method of deciding at what rate the pixel captures data and a method of encoding this multi-rate frame, content may be selectively blurred or strobed on a standard frame-rate display based on motion estimation, viewer eye movement estimation or viewer eyes tracking in.

Additionally, high frame-rate video reduces an effective dynamic range of the captured image by raising the noise floor in captured content. This is due to the high illumination and/or gain requirements of short exposure capture. The instant disclosure may addresses this with a reprogrammed CMOS sensor that captures sequences of at least two exposures of different duration that are offset in time for different pixels, e.g. long-short-long-short exposure sequences offset in time at the individual pixel.

The present disclosure describes a system for capturing, processing and transmitting high frame-rate video within a standard frame rate. With respect to capture, for individual pixels, in one embodiment a camera sensor captures a short and a long exposure. With respect to processing, based on a simple decision tree, it is decided whether to utilize the short or long exposure. The decision may be different for individual pixels. With respect to transmission, the image is divided into S×T sub-blocks (e.g., S, T=4), with sub-block comprising an array of pixels captured at 1/(S*T) of the total frame time. This is equivalent to generating a temporal interlace matrix. The interlaced pattern may be transmitted from an encoder to the decoder.

One solution proposed by the instant disclosure is to send high frame-rate information in a standard frame-rate video. Rather than capturing and recording video frames from a single time window, a time-offset array and record adjacent, short-exposure pixels from shifted points in time distributed over the frame's time window was performed.

Motion blur may appear as a dither pattern. Rendering for dither correction may entail that the time window may be reduced or expanded in different parts of the image. Where motion is estimated, eye tracking is estimated or the observer is known to visually track an object, the object may be strobed for a sharper appearance.

Conversely, untracked objects may be rendered with full motion blur. The proposed format may improve video frame-rate conversion results, both for slower and for higher frame rates. By designing image sensors to record long-short-long-short exposure sequences, a low-noise version of this representation in high dynamic range (HDR) may be created while avoiding issues of ghosting normally associated with high dynamic range.

The instant disclosure proposes methods to send high frame-rate data in a standard frame-rate video by interlacing short-exposure pixels in a tiled matrix. Displayed on a standard frame-rate device, such video may show dither patterns where there is high-speed motion, which from a distance may be equivalent to a 360° shutter (motion blur). Given the at least two capture rates proposed, the amount of motion blur may be modified to simulate any equivalent shutter. This selective modification may be different over different parts of the image based on the degree of motion and the expected or measured eye movement for the scene. In regions where there is little motion, pixels may be captured at a lower rate or averaged to reduce the noise associated with high frame-rate sensors. By modifying the capture method, high dynamic range pixels may be obtained as well.

FIG. 1 depicts an imaging system 100. The image system comprises a pixel image sensor array 110 disposed on a substrate, the pixel image sensor array 110 comprising a plurality of pixels 112. S×T subsets of said plurality of pixels are defined. A multi-stage timer 114 is coupled to the pixel image sensor array 110 and configured to trigger, for each of the subsets, a sequence of at least two exposures of different capture duration of the pixels of said subset. The sequences corresponding to different subsets are triggered in a predetermined order, with start times of subsequent sequences being temporally offset by a predetermined offset $t_{offset}$. The sequences have the same overall duration T and the predetermined temporal offset $t_{offset}$ is smaller than said overall duration.

An analog to digital converter (ADC) 116 is coupled to the pixel image sensor array 112 and converts the at least two exposures of the at least one of the plurality of pixels of the subsets to pixel digital values. A memory 118 is coupled to the at least one ADC 116 to store the pixel digital values. A logic circuit 120 is coupled to the memory 118 and determines for each pixel of the image sensor array which of the corresponding stored pixel digital values to upload to a video frame. The logic circuit may scale, e.g. multiply, the stored pixel digital values based upon the different exposure durations, e.g. on the basis of a ratio between two capture durations. For example, when the pixels are exposed according to sequences comprising a short exposure of duration $t_1$ and a long exposure of duration $t_2=k*t_1$, the stored pixel digital value of the short exposure is scaled by multiplying by k or the store pixel digital value of the long exposure is scaled by multiplying by 1/k. The logic circuit may determine for each pixel which of the corresponding pixel digital values to upload based on a degree of movement on the basis of the stored pixel digital values of the at least two exposures of different capture durations. The degree of movement is determined by a difference threshold between the two measured exposures at a pixel. If the difference is above the threshold determined by the noise level in the shorter exposure plus a local sensitivity adjustment, then the shorter exposure is used for this position.

For example, for pixels exposed according to a sequence comprising a short exposure and a long exposure, the pixel digital value of the short exposure or the pixel digital value of the long exposure is first scaled, and subsequently the absolute difference between the scaled pixel digital value and the other pixel digital value is calculated. If said difference exceeds a predetermined threshold, which may be indicative of an expected noise level, it is determined that movement was present for this pixel and the pixel digital value corresponding to the shortest exposure is selected for upload.

Figure 2:
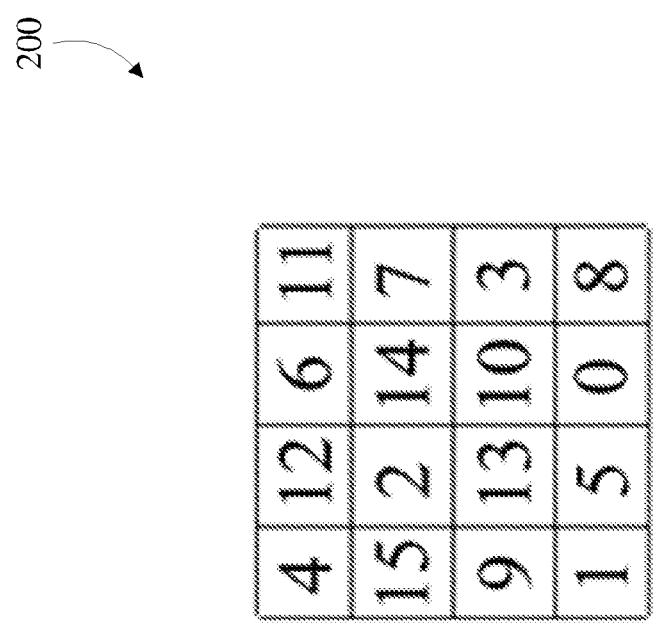

FIG. 2 depicts a pixel population (200) having a well-mixed temporal offset matrix. The temporal offset matrix is an S×T matrix (S=T=4, in the example of FIG. 2), which defines which pixel belongs to which of the N=S*T subsets (16 subsets in the example of FIG. 2). The pixel image sensor array is divided into a plurality of subarrays of dimension S×T, and the pixels of each subarray are assigned to subsets according to the temporal offset matrix. This has the advantage that the pixels of each subset are distributed substantially uniformly over the sensor area. In this embodiment, video is transmitted at a unified frame rate of 30 frames per second (fps), where the shortest exposure duration of the pixels is 1/16th of the total frame time, or 1/480th of a second. The shortest exposure duration may be the same as the temporal offset between the sequences. In the exemplary embodiment, there may be N=S*T=16 time offsets represented in the image, from 0 to 15/480th of a second. Offsets may be represented by approximately 1/16th (1/N) of the pixel population, where adjacent pixels may have the offsets (in 1/480th second multiples). The disclosure applies to any frame rate and especially to those that are specified by the MPEG, movie picture experts group.

The offset placement in the temporal offset matrix is arbitrary, but the results may show less aliasing if the offsets are well-mixed in the sense that adjacent values including neighboring tiles have good separation in time. For example, the temporal offset matrix is constructed such that any two horizontally adjacent pixels and any two vertically adjacent pixels of the pixel image sensor array are not immediately following each other in the predetermined order in which the sequences trigger these pixels.

Based on this assessment, a simple scan-line ordering is undesirable. Furthermore, the temporal offset matrix may be rotated, shifted, or scrambled on a frame-by-frame basis to reduce the "screen door effect." So long as the temporal offset matrix is sent as metadata with the frame, or derivable from a known sequence with a specified starting point, the offsets are easily recovered. Scrambling the temporal offset matrix on a frame-by-frame basis may allow a dither pattern to be hidden from view. In one example data pipeline, a separate rendering stage would be implemented to take advantage of the higher encoded frame rate.

Figure 3:
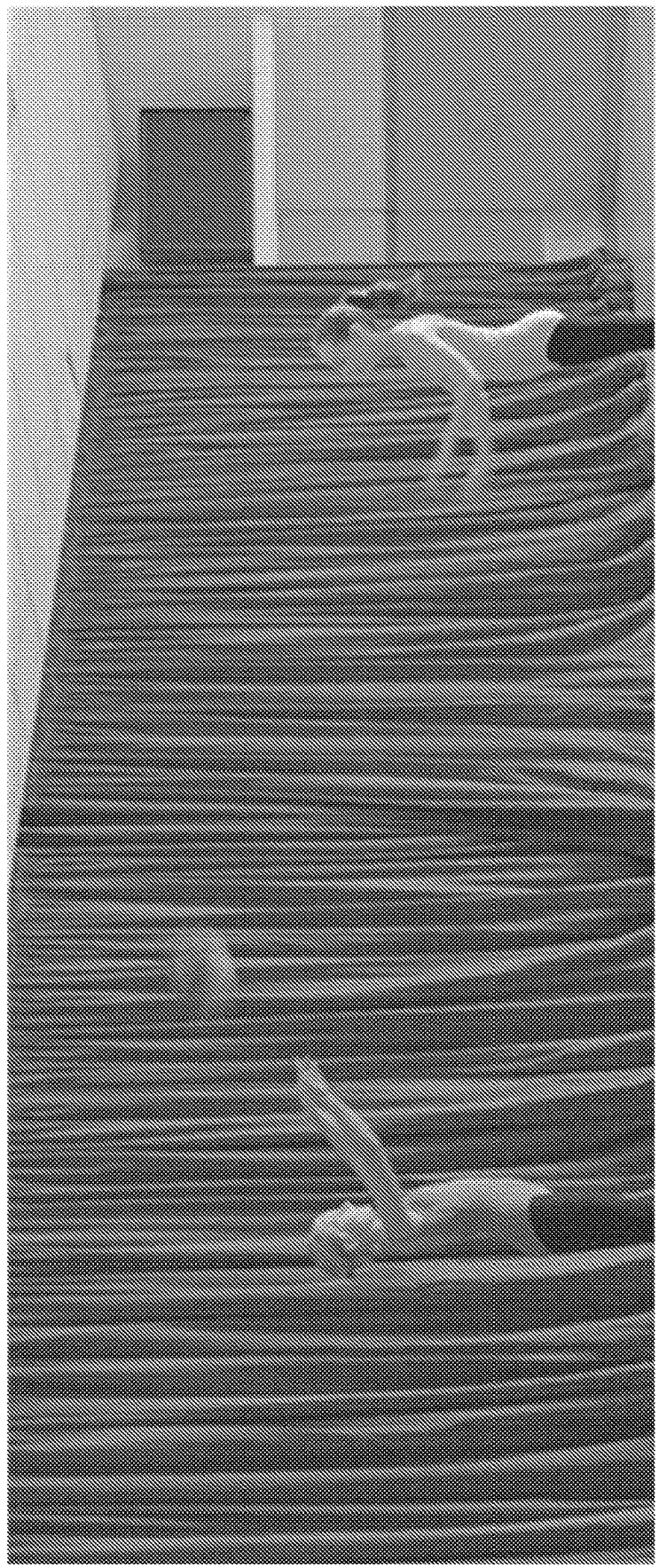
FIG. 3 is a single frame in accordance with one embodiment of the disclosure.
Figure 4:
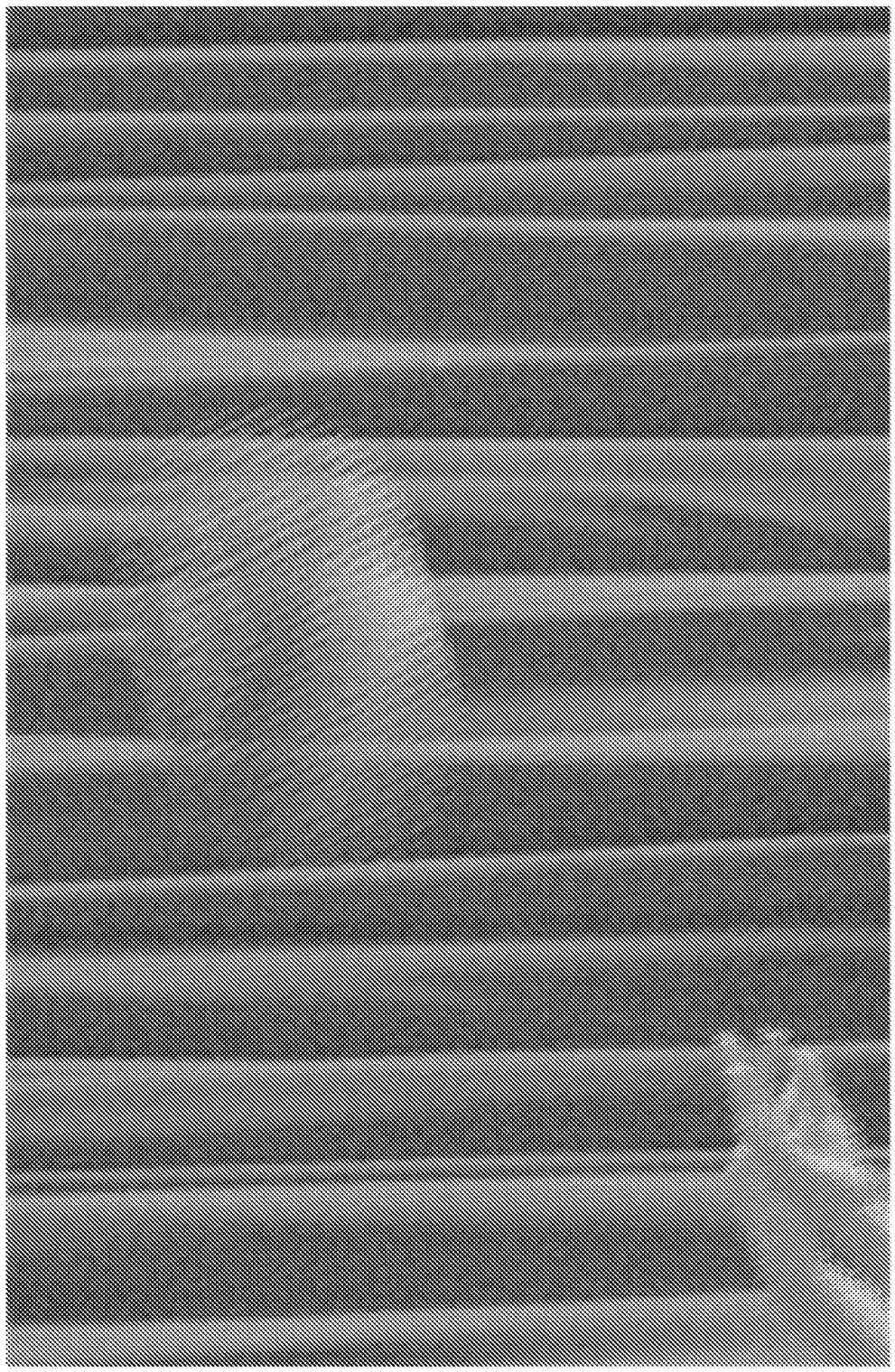
FIG. 4 is a close up of a single frame in accordance with one embodiment of the disclosure.

FIG. 3 depicts an interlaced matrix of pixel data in a picture frame in areas having significant motion, FIG. 4 is a close-up of this interlaced matrix. The possible mitigation of this blurring is one issue that the instant disclosure is seeking to address.

Figure 5:
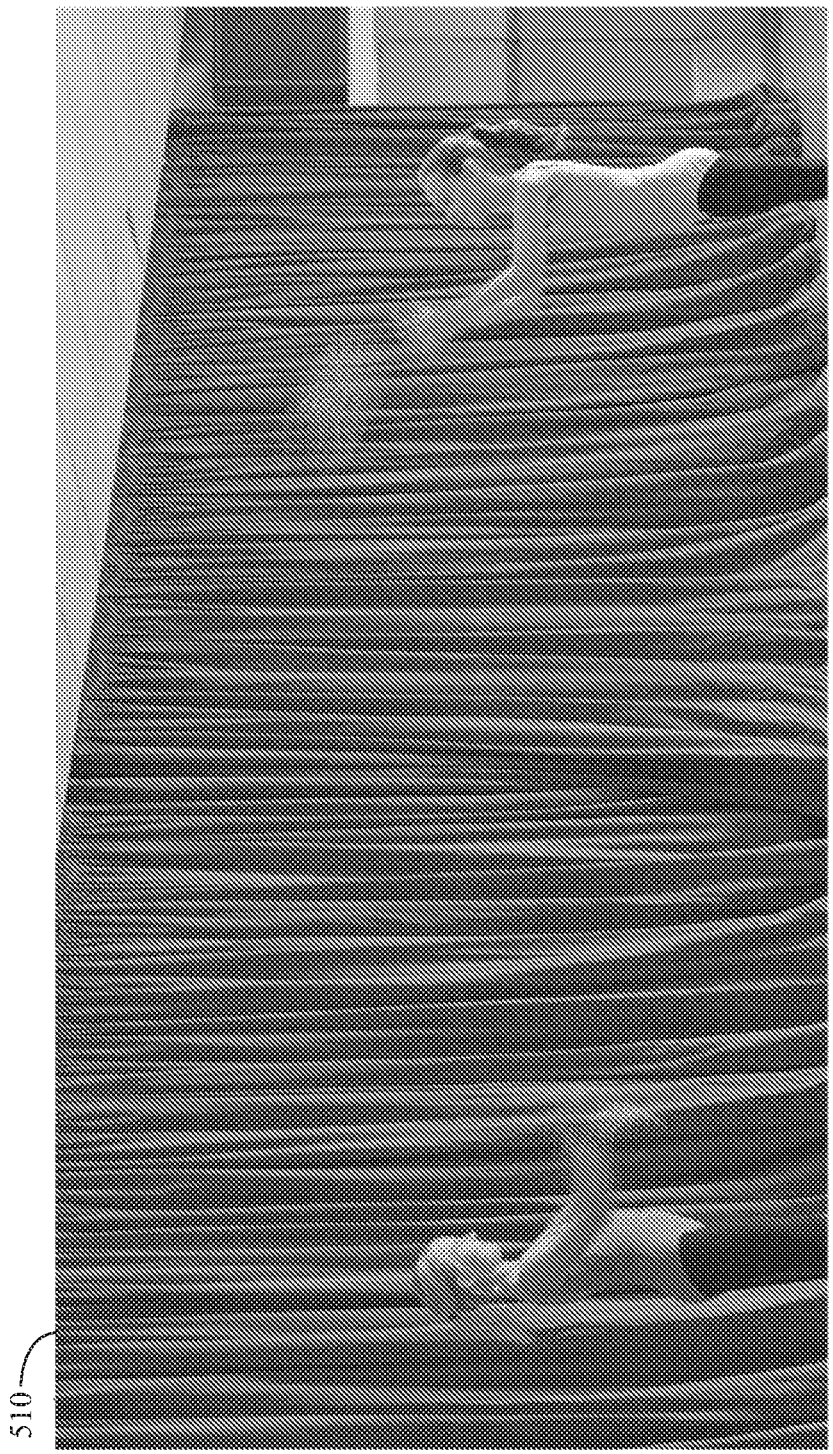
FIG. 5 is a single frame that is temporally dithered at 19 fps rendering in accordance with one embodiment of the disclosure.
Figure 6:
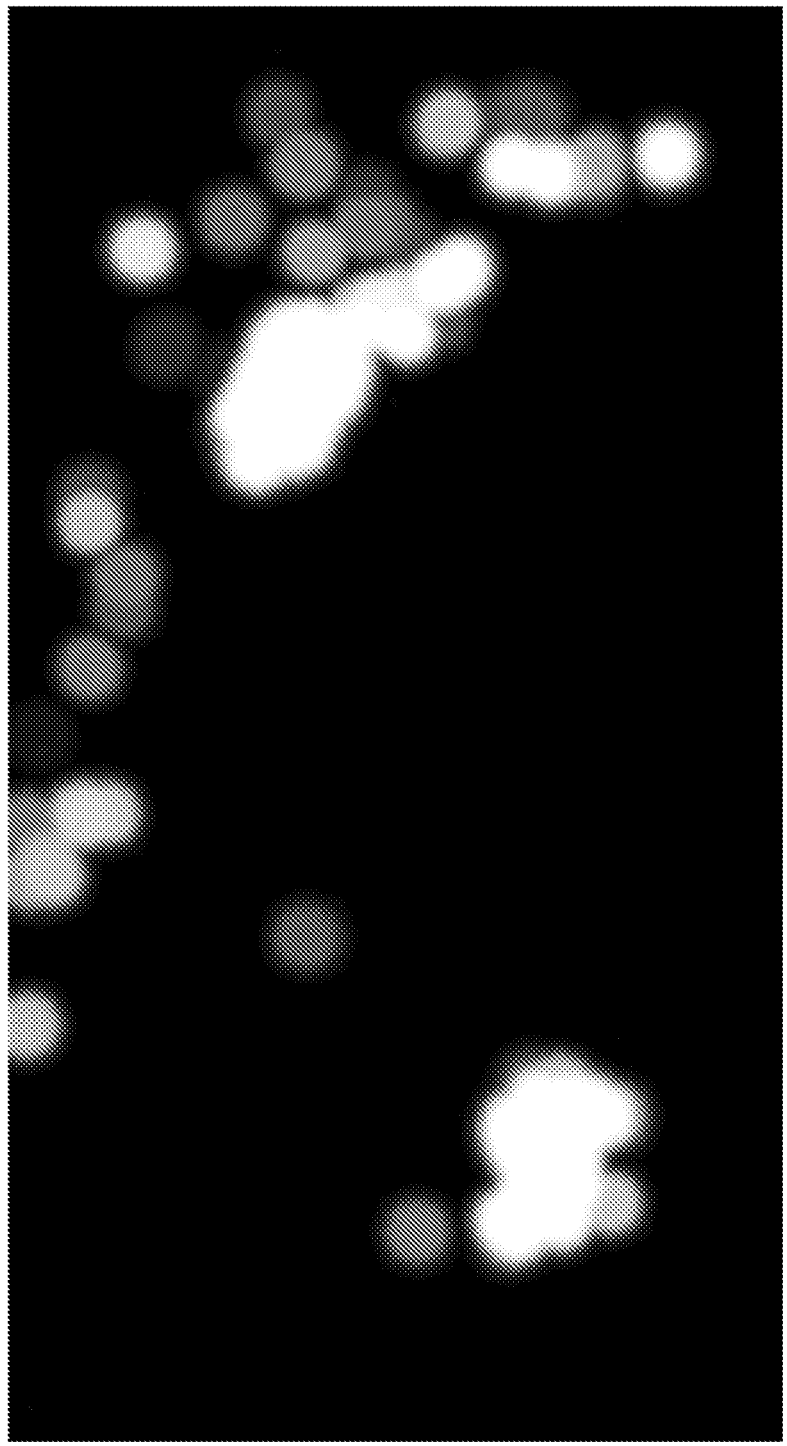
FIG. 6 indicates areas of motion within a single frame in accordance with one embodiment of the disclosure.
Figure 7:
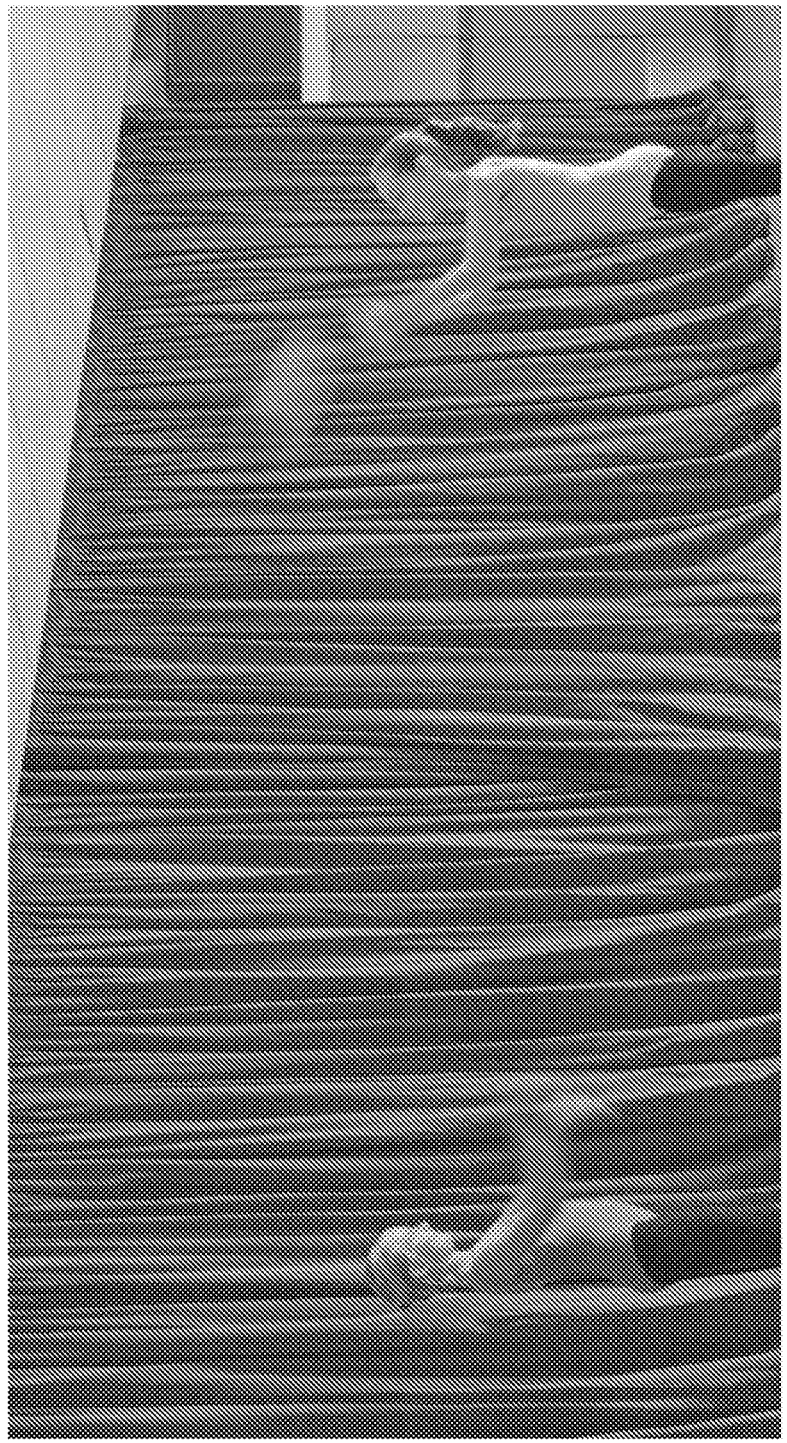
FIG. 7 is a single frame that is blurred at 19 fps rendering in accordance with one embodiment of the disclosure.
Figure 8:
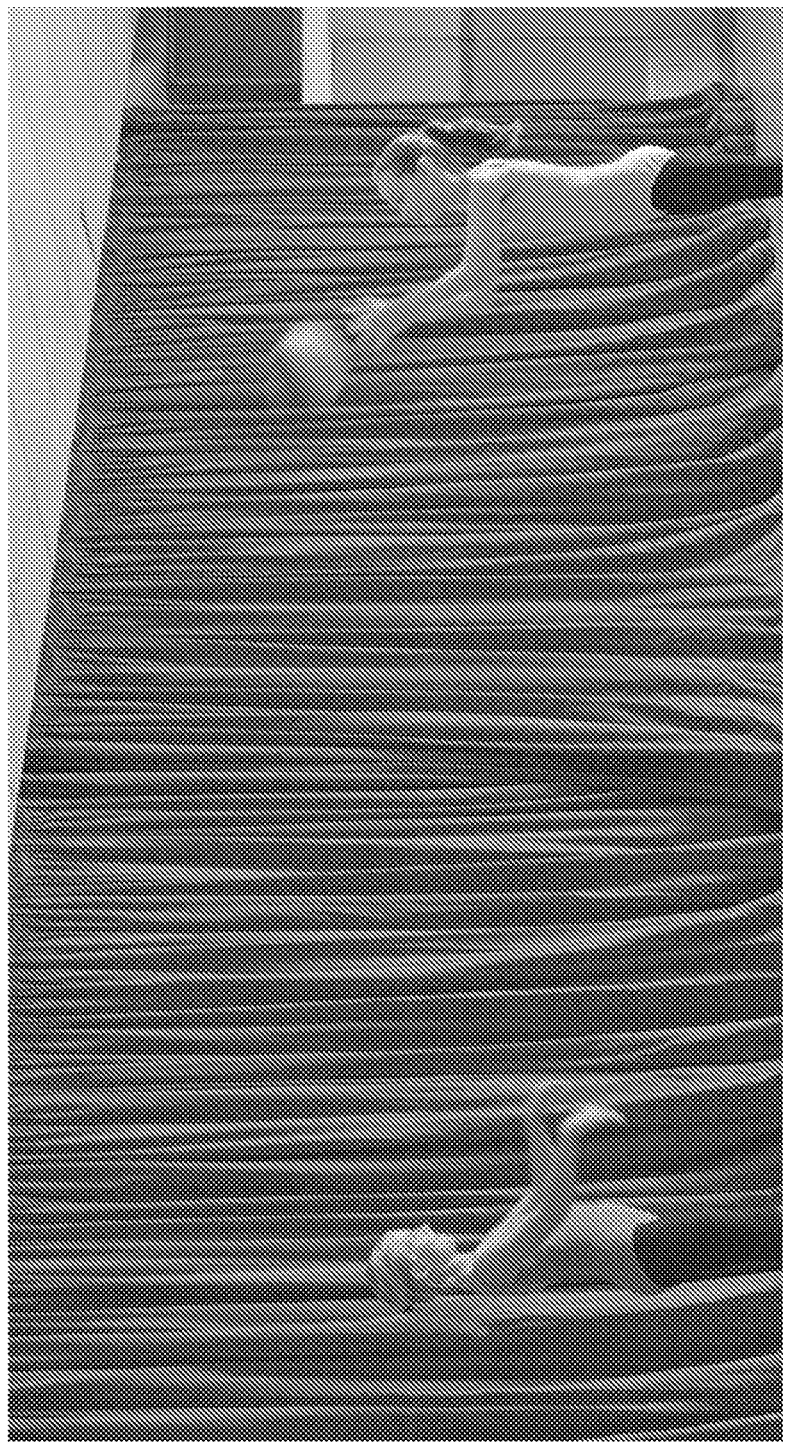
FIG. 8 is a single frame that is blurred at 60 fps rendering in accordance with one embodiment of the disclosure.
Figure 9:
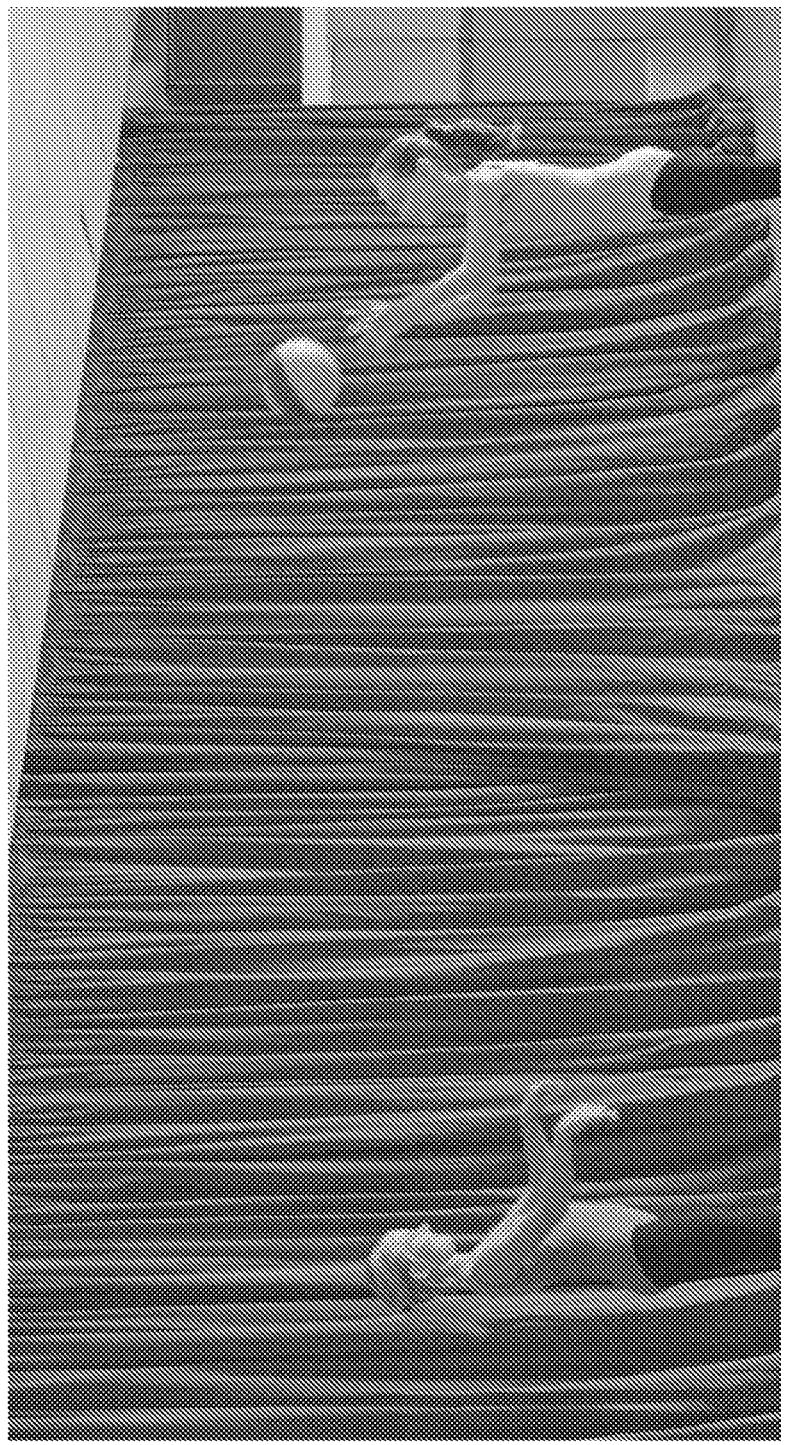
FIG. 9 is a single frame that is tracked at 60 fps with 80% black point insertion rendering in accordance with one embodiment of the disclosure.
Figure 10:
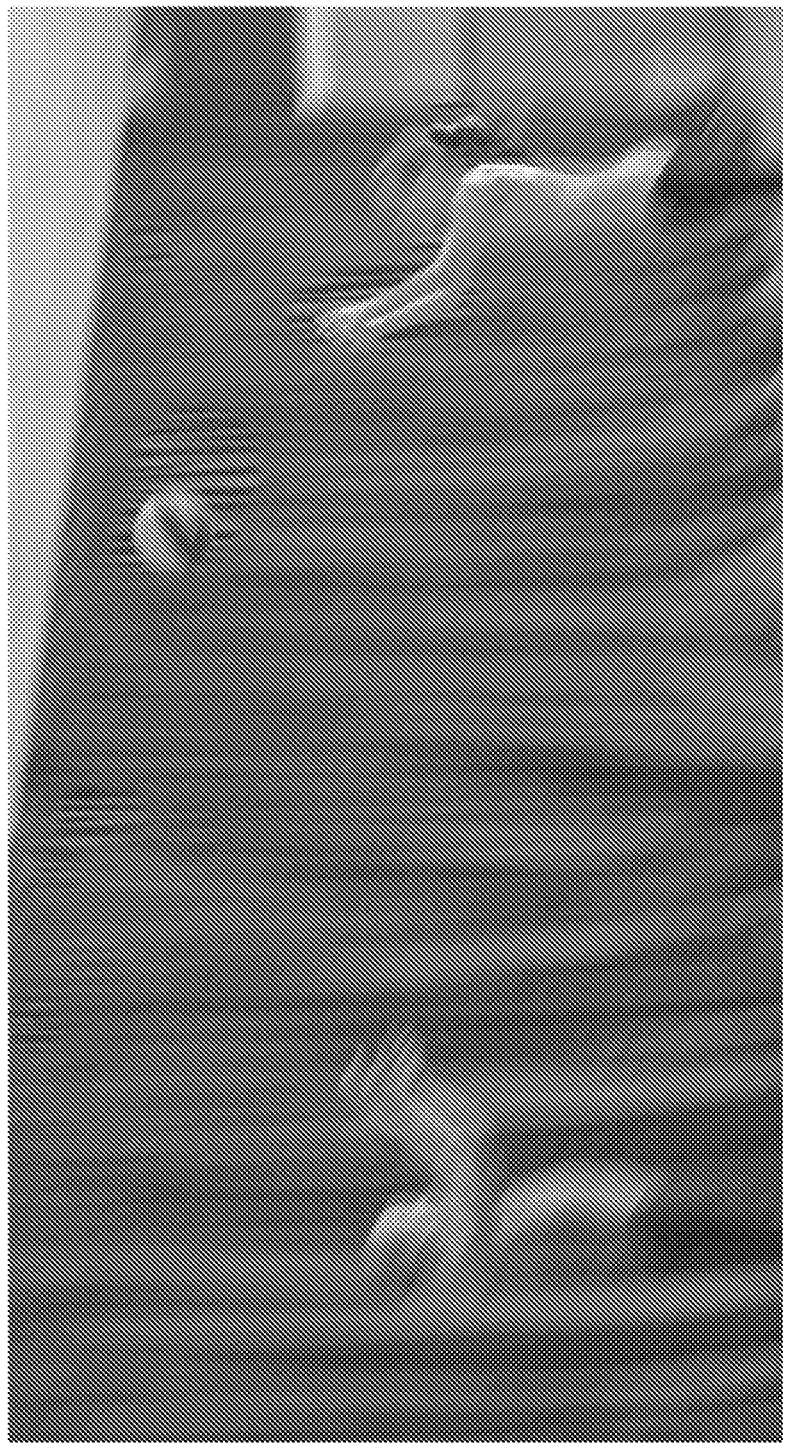
FIG. 10 is a single frame that is tracked at 15 fps with 75% black point insertion rendering in accordance with one embodiment of the disclosure.
Figure 11:
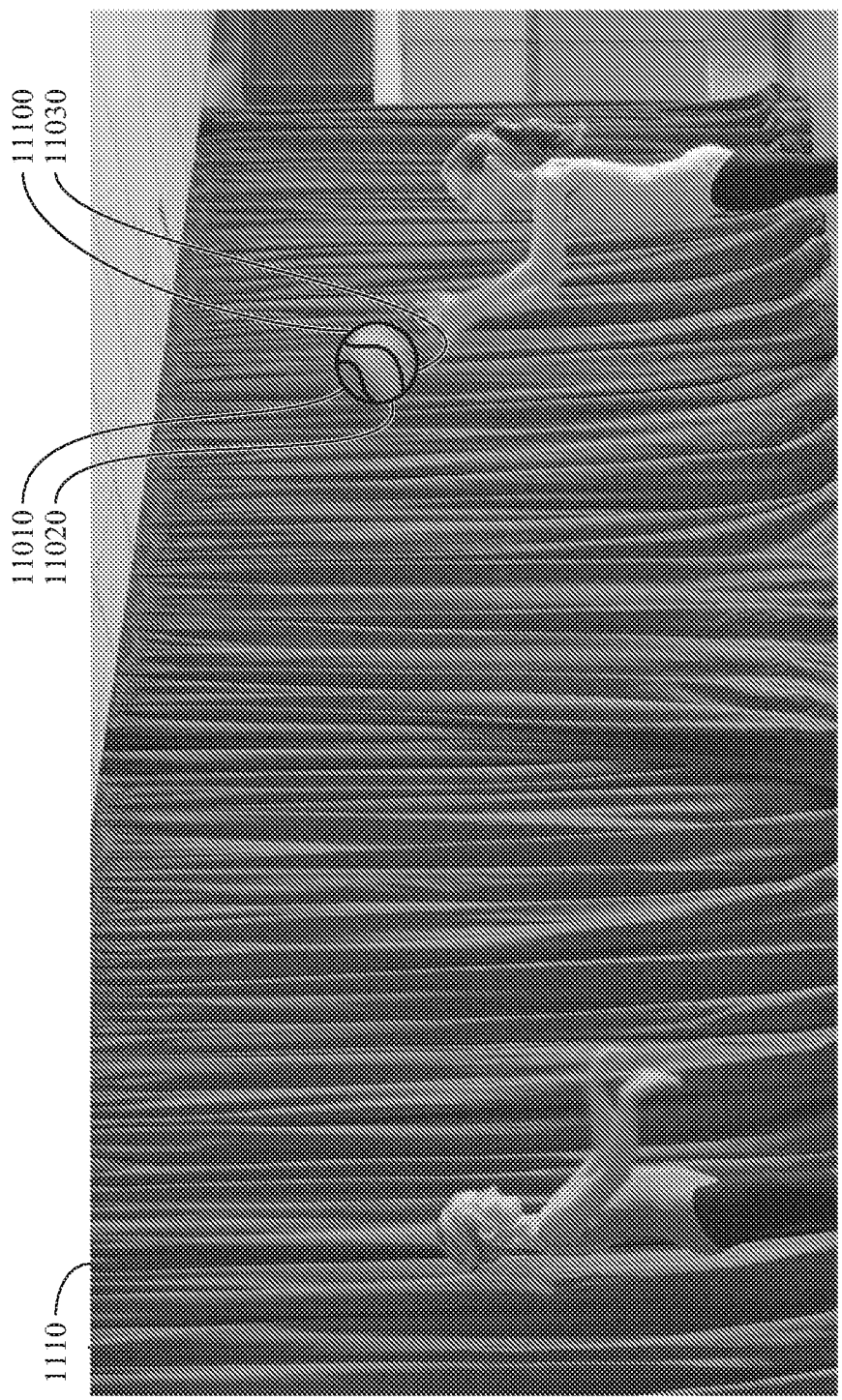
FIG. 11 is a single frame that is tracked at 24 fps for a RGB color wheel rendering in accordance with one embodiment of the disclosure.

FIGS. 5-11 depict different rendering conditions in accordance with various embodiments of the instant disclosure. FIG. 5 depicts a single temporally dithered video frame (510) taken at 19 fps, FIG. 6 shows the motion regions within the video frame, and wherein white regions correspond to areas of higher motion than dark regions, and FIG. 7 shows a single full blur video frame at 19 fps. FIG. 8 shows a single full blur video frame at 60 fps. FIG. 9 depicts a single tracked video frame at 19 fps with 80% black point insertion and FIG. 10 shows a single tracked video frame at 15 fps with 75% black point insertion. FIG. 11 shows a single 24 fps video frame (1110) generated using an RGB color wheel, such as a digital light processing DLP device, showing an example of color breakup. For example, the color ball 11100, originally in yellow and gray, is displayed in color using shades of red (11020) and green (11010, 11030). Embodiments of this invention allow for inserting into a frame temporal information that allows rendering visually tracked objects (such as the ball 11100) without perceived color breakup.

Using a temporal interlace matrix, N sub-frames may be recorded for video frames transmitted at 30 fps. In one example, there are 16 interlaced sub-frames, with ¼ resolution in the x and y spatial dimensions. A bi-cubic interpolation method or the like may be used to up-sample these sub-frames to the overall frame resolution and the result may be a spatially blurred version of video at 480 fps. Trading spatial resolution for temporal resolution is logical for rapidly moving objects the viewer is expected (or observed) to track. Moving objects that are not being tracked by the viewer may be blurred spatially to achieve the equivalent of a 360° shutter. The spatial blur in such regions may be masked by the blur due to motion. In regions where the scene is static and fixed relative to the camera, full resolution is shown.

Such selective blurring assumes some information about how the viewer's eyes are tracking motion in the scene. This may be provided as metadata that is specified by the director, or averaged eye-tracking measurements from test viewers, from eye-tracking hardware built into the display, from motion estimation based on frame to frame deltas and from eye tracking estimation based on frame to frame deltas and their location within the frame. Similarly, displays with array backlights may use selective black point insertion (backlight flashing) to improve temporal resolution in smooth pursuit regions, while using more continuous backlight illumination in regions where retinal blur is natural.

Regions of smooth pursuit comprise areas where an eye movement vector is similar to a local image motion vector. Partially canceling vectors may be used to change the local shutter time proportionally.

Figure 12:
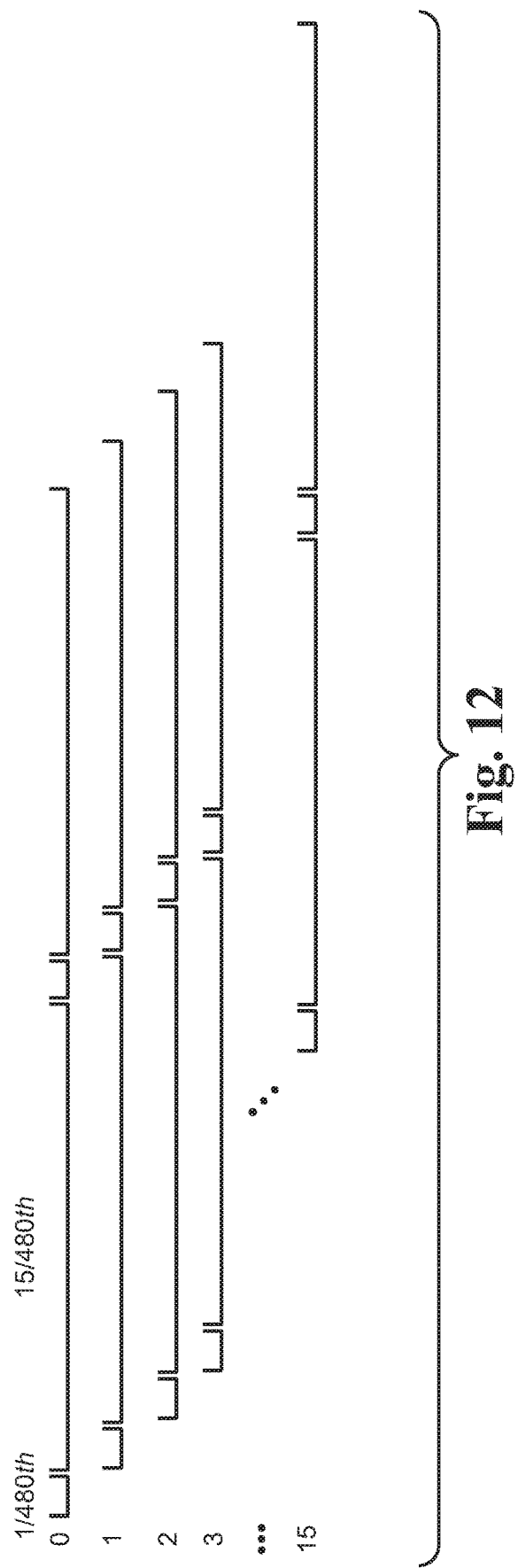
FIG. 12 is an example CMOS capture times and offsets in accordance with one embodiment of the disclosure.

There are at least three ways to capture the image. A first method is to take the output of a full-resolution, high frame-rate sensor and select the temporal offsets for individual pixels. A second method is to take a lower-resolution, high frame-rate sensor (e.g., ¼ resolution in x-y dimensions) and use sensor-shifting to capture the individual pixels at their associated times. This assumes the sensor has a low fill factor as is often the case with CMOS designs. A third method employs a full-resolution CMOS sensor in which adjacent pixels are programmed to capture offset long-short-long-short exposure sequences. FIG. 12 depicts an example of CMOS times and offsets in accordance with this third method. The example shows S*T=16 sequences, each sequence comprising a short exposure and a long exposure. The sequences are identical, but temporally offset, wherein the temporal offset $t_{offset}=T_f/(S*T)$, with $T_f$ being the total duration of each sequence, or the inverse of the transmission frame rate, (e.g., $T_f=\frac{1}{30}$ in the example). Therefore in the example, $t_{offset}=\frac{1}{480}$. In the example the duration of the short exposure corresponds to the temporal offset.

In existing CMOS sensors, a rolling shutter exposure is used, wherein rows of pixels are grouped together for row-by-row exposure. In an exemplary embodiment of the third method described above, the circuit of a CMOS sensor is adapted to group the pixels of each subset together. Therefore, this exemplary CMOS sensor can expose the pixels subset-by-subset instead of row-by-row. For example, the CMOS sensor circuit defines N subsets of pixels by subdividing the pixel image sensor array into subarrays of N pixels and including in each subset a single pixel from each subarray. It is noted that the order of triggering the different subsets is determined by the multi-stage timer and may be reprogrammable. For example, as described herein, the order the subsets are triggered, e.g. defined by a temporal offset matrix, may be changed on a frame-by-frame basis by the multi-stage timer.

The long-short exposure sequence may offer two related advantages, low noise and high dynamic range. The output of the analog-to-digital converter (ADC) may be two 12-bit linear values for the captured frame. If the two values agree within the expected noise of the shorter exposure, then the long exposure may be utilized as this indicates that minimal motion occurred within the frame.

There may two cases where the output of the long exposure and the short exposure may be at variance. In the first case, an object may be moving across a given pixel within the frame. For example, in an embodiment, motion can be detected if the absolute difference of an exposure value in the short and long exposures is larger than a threshold. Pixel values differ due to the exposure time, exposure values (EV) change if the scene changes or the pixel is saturated. In this instance the short exposure may be selected for its temporal accuracy. In the second case, the number of photons received by the given pixel is high, causing the long exposure to saturate or exposure overflow, i.e., clip. When an overflow is detected, again, in an embodiment, the shorter exposure is selected. In either case, the noise in the short exposure may not be an issue, because either it is masked by scene motion or it has captured a sufficient number of photons to be above the noise floor. If a short exposure is not selected, then the longer exposure is selected.

Irradiance is the radiant flux (or power) received by a surface per unit area and radiant exposure is the irradiance of a surface integrated over the time of irradiation. One example of the instant disclosure measures the change in irradiance at a pixel site that is the result of either motion at that position or pixel overflow at that position. The relative irradiance of the pixel site from both the long and short exposure allows differentiation of motion from pixel overflow, in either case the shorter exposure is selected. The threshold corresponding to this relative irradiance may be modified by a local function of recently detected motion, based on a bitmap resulting from previous decisions. The bitmap may be a grayscale image and the selection may comprise a mixing for some range of relative irradiance wherein a fraction of both the short and long exposure values are mixed.

When a short exposure is selected, it may be multiplied by an appropriate scalar, which is equivalent to shifting the value left by 4 bits in one example, thus, achieving a low-noise 16-bit signal from a 12-bit ADC. The scalar may be based on the ratio of the different capture durations. A compressed bitmap indicating which pixels used long versus short exposures may be useful if the decision is made in the camera's sensor or SOC. For example, a blurred version of this bitmap could be used to adjust the noise thresholds for the next frame, improving the motion sensitivity by pooling local information. The threshold for the image sensor may benefit from a pooling of information to raise the threshold and thus avoiding noise spikes in regions where no motion was recently seen, and lowering the threshold in image regions where motion is estimated. This may be accomplished by blurring the bitmap of pixels chosen from the short exposure in a previous frame and using this blurred image to adjust the threshold.

A high frame-rate CMOS sensor may be used in the capture method described by summing together 15 of the 16 frame pixels and applying the same selection criteria. In this case, it may not be necessary to choose the short exposure for bright pixels, only for those with significant motion. However, the reduction in noise may not be as great, since many sensors are dominated by readout noise rather than shot noise. In one example a readout is performed 15 times for the synthesized long exposures, the noise cancels much less effectively.

A perennial problem with video is converting between different frame rates. If frame-rate conversion takes place at display time, one method for selective motion rendering described earlier is altering an integration window to be larger or smaller to accommodate the display's target frame rate. If frame-rate conversion is being performed off-line, an adjustment to the time interpolation matrix may match the longer or shorter frame time. This method allows the option of selectively rendering the video. For example, the matrix may be extended from a 16-entry offset table to a 20-entry table (perhaps in a 4×5 matrix) when converting from 30 to 24 fps. Converting to a higher frame rate may result in a smaller matrix, which may correspond to a slight loss in spatial resolution unless some form of motion interpolation was applied. To facilitate motion interpolation, the detailed temporal information may yield more accurate motion vectors.

Video compression relies on estimating image motion vectors, therefore adaptation to existing codecs with minor modifications may be expected. Motion vectors may be computed from the sub-frames of a de-matrixed (de-interlaced) source video. These motion vectors may be useful for compression as well as the adaptive motion rendering described earlier. The sub-frames may also be compressed separately in regions of significant motion to reduce high frequency spatial content, or the frames may be pre-rendered assuming a particular eye motion vector and sent as standard video. The motion rendering and frame-rate conversion may be combined as well.

Figure 13:
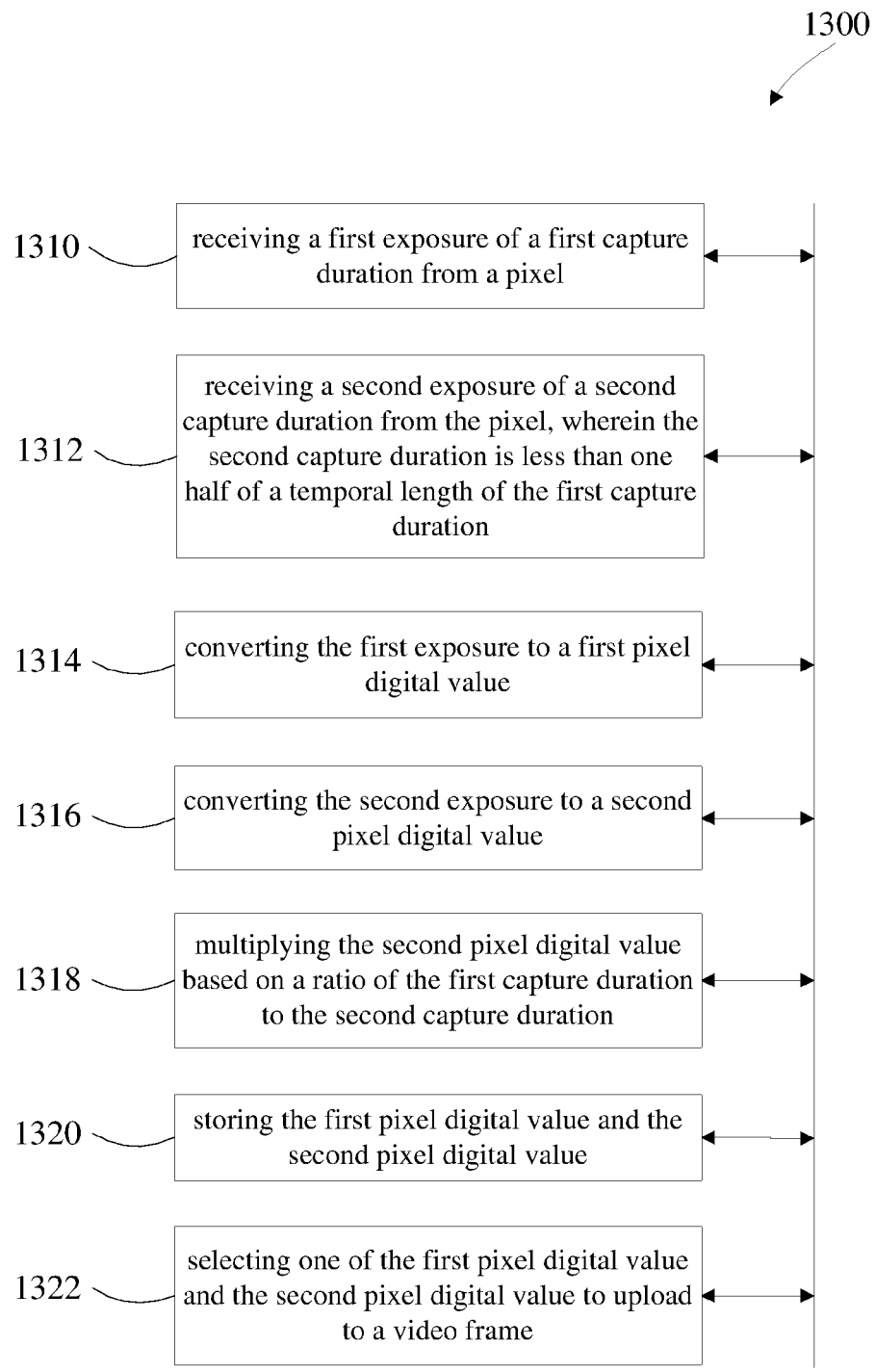
FIG. 13 is an example of a method of image processing in accordance with one embodiment of the disclosure.

FIG. 13 depicts a method of image processing 1300 that comprises: receiving 1310 a first exposure of a first capture duration from a pixel, receiving 1312 a second exposure of a second capture duration from the pixel, wherein the second capture duration is less than one half of a temporal length of the first capture duration and converting 1314 the first exposure to a first pixel digital value. The method also comprises converting 1316 the second exposure to a second pixel digital value, multiplying 1318 the second pixel digital value based on a ratio of the first capture duration to the second capture duration, storing 1320 the first pixel digital value and the second pixel digital value and selecting 1322 one of the first pixel digital value and the second pixel digital value to upload to a video frame.

Figure 14:
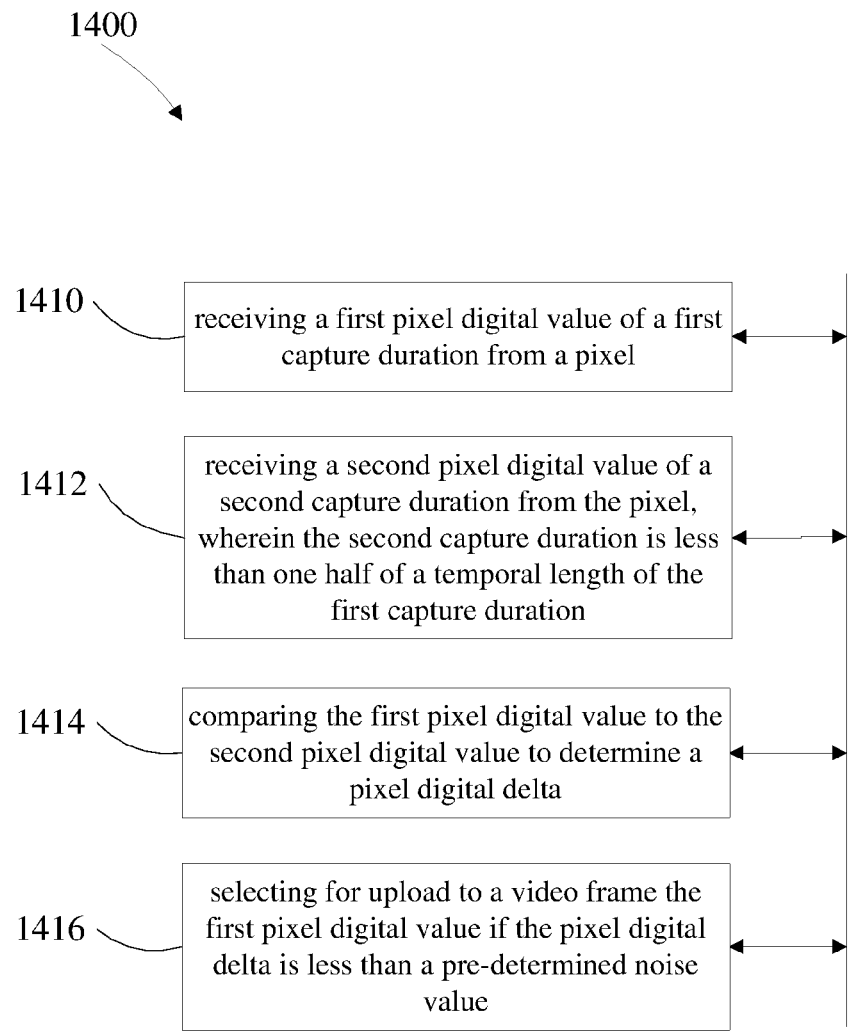
FIG. 14 is a first example of a method of encoding an image in accordance with one embodiment of the disclosure.

FIG. 14 depicts a first method of encoding an image 1400, which comprises: receiving 1410 a first pixel digital value of a first capture duration from a pixel and receiving 1412 a second pixel digital value of a second capture duration from the pixel, wherein the second capture duration is less than one half of a temporal length of the first capture duration. The method further comprises comparing 1414 the first pixel digital value to the second pixel digital value to determine a pixel digital delta and selecting 1416 for upload to a video frame the first pixel digital value if the pixel digital delta is less than a pre-determined noise value.

Figure 15:
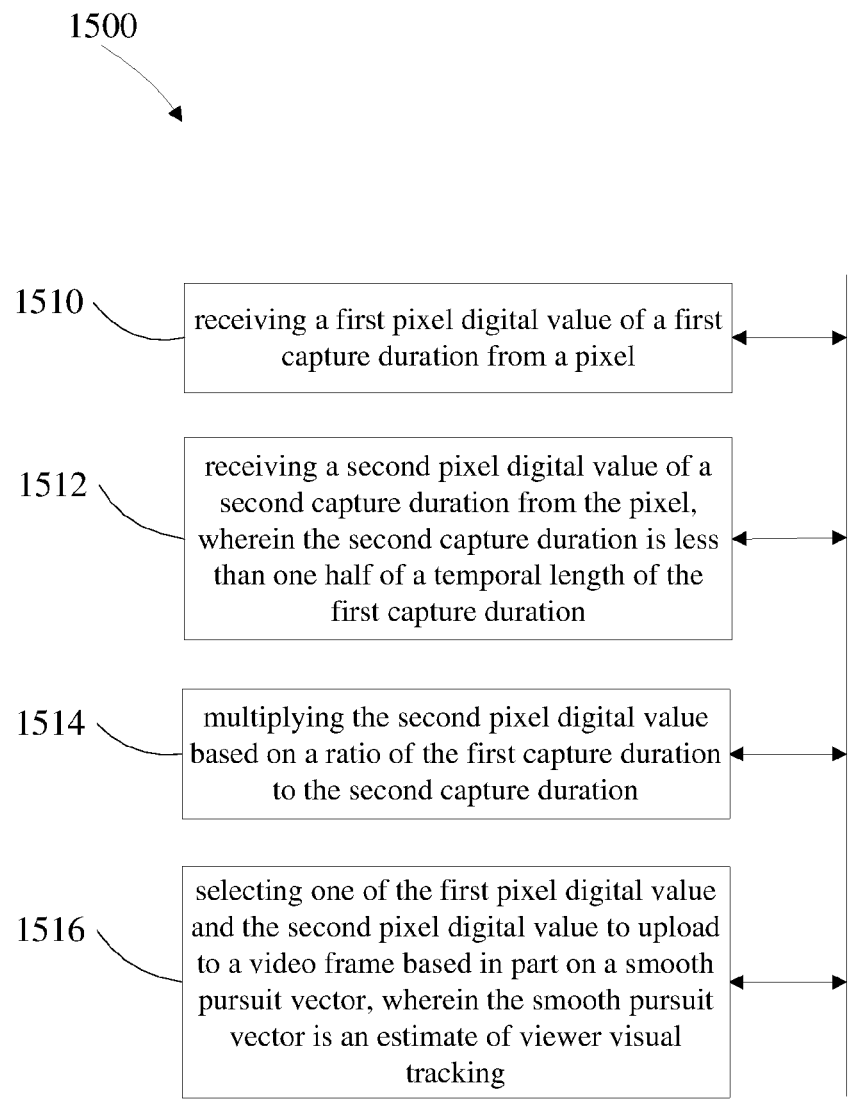
FIG. 15 is a second example of a method of encoding an image in accordance with one embodiment of the disclosure.

FIG. 15 depicts a second method (1500) of encoding, comprising: receiving 1510 a first pixel digital value of a first capture duration from a pixel, receiving 1512 a second pixel digital value of a second capture duration from the pixel, wherein the second capture duration is less than one half of a temporal length of the first capture duration, multiplying 1514 the second pixel digital value based on a ratio of the first capture duration to the second capture duration and selecting 1516 one of the first pixel digital value and the second pixel digital value to upload to a video frame based in part on a smooth pursuit vector, wherein the smooth pursuit vector is an estimate of viewer visual tracking.

Figure 16:
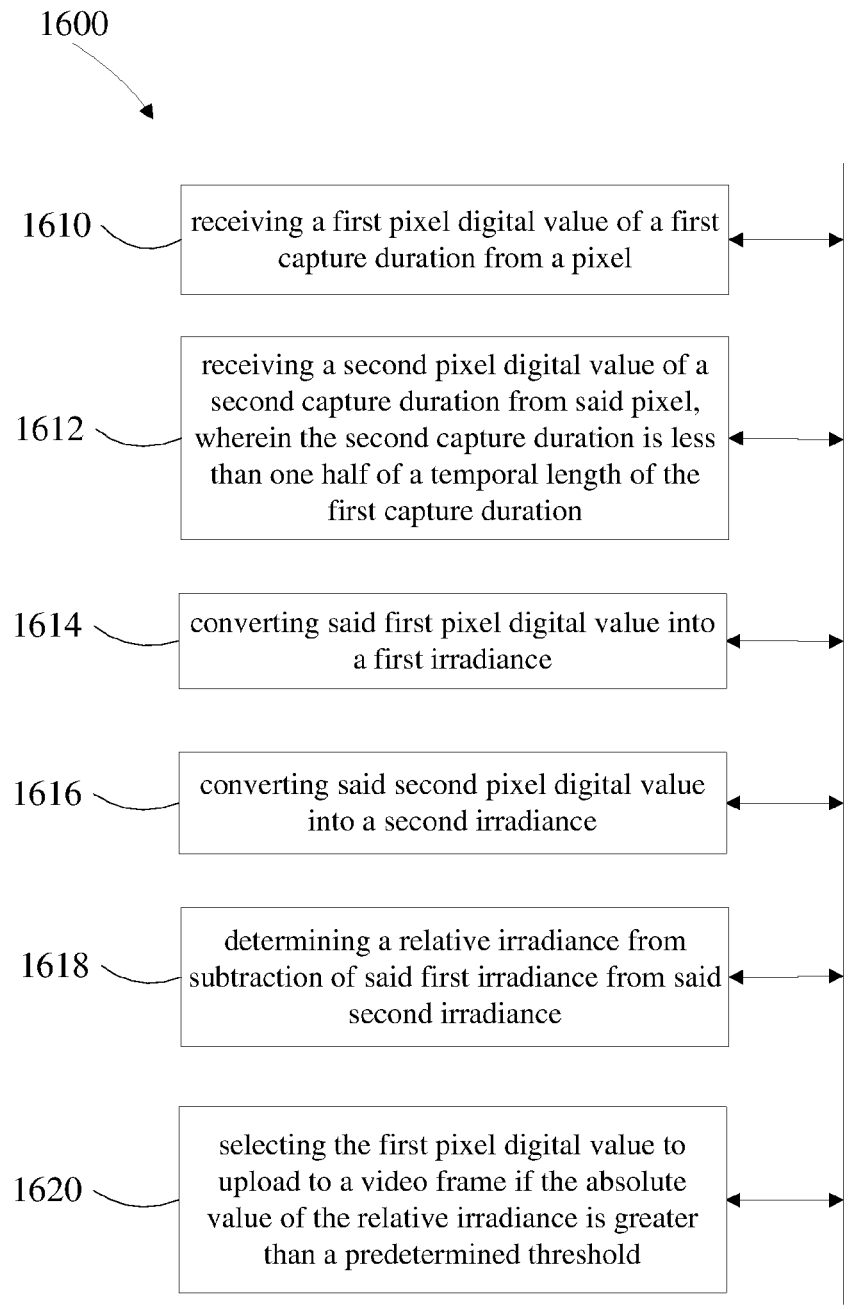
FIG. 16 is a third example of a method of encoding an image in accordance with one embodiment of the disclosure.

FIG. 16 depicts a third example method of encoding (1600), comprising: receiving 1610 a first pixel digital value of a first capture duration from a pixel, receiving 1612 a second pixel digital value of a second capture duration from the pixel, wherein the second capture duration is less than one half of a temporal length of the first capture duration, converting 1614 the first pixel digital value into a first irradiance, converting 1616 the second pixel digital value into a second irradiance, determining 1618 a relative irradiance from subtraction of the first irradiance from the second irradiance and selecting 1620 the first pixel digital value to upload to a video frame if the absolute value of the relative irradiance is greater than a predetermined threshold.

Figure 17:
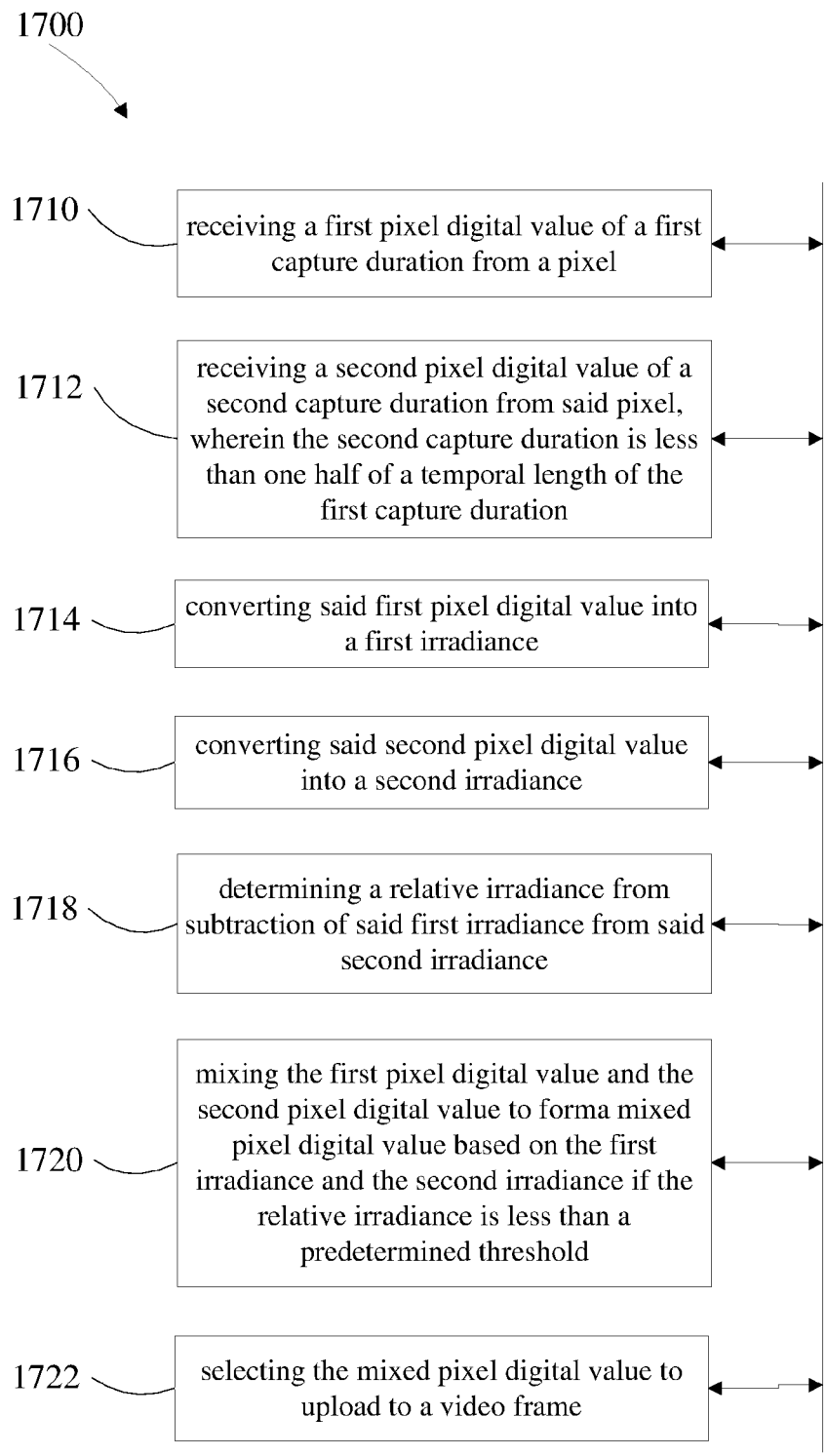
FIG. 17 is a fourth example of a method of encoding an image in accordance with one embodiment of the disclosure.

FIG. 17. depicts a fourth example method (1700) of encoding, comprising: receiving 1710 a first pixel digital value of a first capture duration from a pixel, receiving 1712 a second pixel digital value of a second capture duration from the pixel, wherein the second capture duration is less than one half of a temporal length of the first capture duration, converting 1714 the first pixel digital value into a first irradiance, converting 1716 the second pixel digital value into a second irradiance, determining 1718 a relative irradiance from subtraction of the first irradiance from the second irradiance, mixing 1720 the first pixel digital value and the second pixel digital value to form a mixed pixel digital value based on the first irradiance and the second irradiance if the relative irradiance is less than a predetermined threshold and selecting 1722 the mixed pixel digital value to upload to a video frame.

Figure 18:
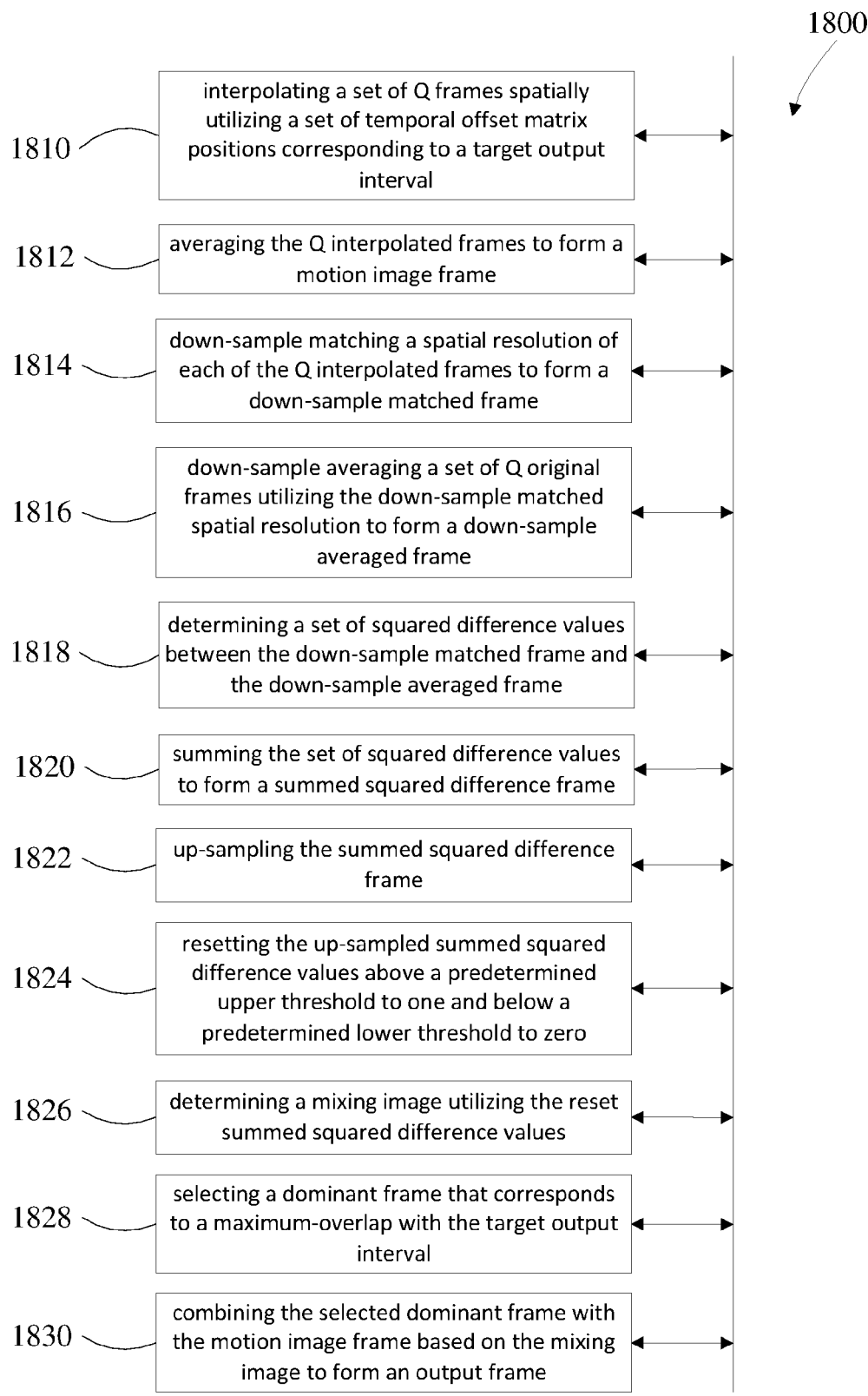
FIG. 18 is an example of a method of decoding an image in accordance with one embodiment of the disclosure.

FIG. 18 depicts an example method (1800) of decoding a temporally offset frame, e.g. a frame of a video encoded as described above with respect to FIGS. 13-17, the method of decoding (1800) comprising interpolating 1810 a set of Q frames spatially utilizing a set of temporal offset matrix positions corresponding to a target output interval, averaging 1812 the Q interpolated frames to form a motion image frame, down-sample matching 1814 a spatial resolution of each of the Q interpolated frames to form a down-sample matched frame and down-sample averaging 1816 a set of Q original frames utilizing the down-sample matched spatial resolution to form a down-sample averaged frame. The method further comprises determining 1818 a set of squared difference values between the down-sample matched frame and the down-sample averaged frame, summing 1820 the set of squared difference values to form a summed squared difference frame, up-sampling 1822 the summed squared difference frame, resetting 1824 the up-sampled summed squared difference values above a predetermined upper threshold to one and below a predetermined lower threshold to zero and determining 1826 a mixing image utilizing the reset summed squared difference values. The method also comprises selecting 1828 a dominant frame that corresponds to a maximum-overlap with the target output interval and combining 1830 the selected dominant frame with the motion image frame based on the mixing image to form an output frame.

The letter Q in this example corresponds to how many of the frames recorded in the highest recorded frame rate overlap the target frame interval. For example, at 30 fps video transmission with a 4×4 temporal offset matrix, the maximum frame rate is 480 fps, i.e. 30×4×4. For a target frame rate of 120 fps output video, then Q would be 4, corresponding to the number of 480 fps frames in a 120 fps target frame; or 480/120. Alternatively, for a 60 fps output video, then Q would be 8. Thus, Q×target fps=transmitted fps×(S×T)=maximum fps, where S×T denotes the size of the temporal offset matrix.

In some embodiments, the ratio of Q=maximum fps/target fps may not be an integer, in which case Q may not remain a single value and may alternate between two or more values. For example, for a target frame rate of 19 fps, then Q may be 25 for some output frames and 26 for others, depending on where the frame interval limits land.

The following terms may apply to the decoder: an "encoded frame" is a transmitted video frame with an embedded temporal offset matrix, a "time slice" or "sub-frame" is a decoded frame corresponding to temporal offset matrix interval, and a "target output interval" is the period between virtual shutter open and virtual shutter close.

In an example embodiment, a decoder may perform the following:
1. receive the encoded frames, decode them, and reconstruct embedded time offset matrices (sub-frames) which overlap a target output interval;
2. using time offset matrix positions, spatially interpolate each of the Q time slices that correspond to the target output interval;
3a. downsample each of these Q interpolated time slices to match true spatial resolution; One example of which would be to downsample by a factor of 4 in each dimension for 4×4 temporal offset matrix.

3b. downsample and average encoded frames by the same spatial factors used in (3a);

3c. determine the squared differences between each downsampled time slice from (3a) and the single averaged frame from (3b) and add these differences together, or alternately determine the maximum of the squared differences may be utilized.

4. upsample to the target display resolution the computed difference image and convert into a "mixing image" where large differences equal a mixing value of 1.0 and small differences equal a mixing value of 0;

5. average together the Q time slices from (2) to compute the "motion image";

6. select "dominant" encoded frame corresponding to central or maximum-overlap with target output interval;

7. use mixing image from (4) to combine dominant frame from (6) with average of Q time slices from (2) to compute optimized output frame; and 8. repeat (1)-(7) for each encoded channel if target output uses frame sequential color.

Step 2 comprises spatial interpolation and upscaling. In the example there are two resolutions the transmitted video resolution and this resolution divided by the S and T of the temporal offset matrix. The former may be HD or 4K to match the desired target display resolution and the latter may be one quarter the target resolution in each dimension if we use a 4×4 matrix. Upscaling accounts for matrix positions and interpolation is performed at the maximum frame-rate images using bi-cubic, bilinear interpolation, or other up-scaling methods known in the art, such that the results align properly with each other.

In step 3a the down-sample dimension is 480×270 resolution in this example.

In step 4 the up-sample dimension is the target resolution, 1920×1080 in this example. Additional image operations before and after up-sampling, such as erosion, dilation, and blurring, may be applied to the mixing image to improve the final results.

In step 5, the "motion image" may correspond to a high temporal resolution image. The "motion image" may be formed as a linear combination of the time slices, preferably by averaging the spatially interpolated time slices. Alternatively, the "motion image" can be formed by selecting one of the spatially interpolated time slices or forming a weighted average of the spatially interpolated time slices.

In step 6, as an example one may compute the dominant frame as the input frame with the most temporal overlap with the output frame. The dominant frame may correspond to a high spatial resolution image.

In step 7 the dominant frame is combined with the average using the mixing image, which corresponds to detected motion in the video. Where there is motion, the average of the Q subframes, i.e. the "motion image" of step 5 is utilized and where there is no motion, the dominant input frame with its higher spatial resolution is utilized.

Figure 21:
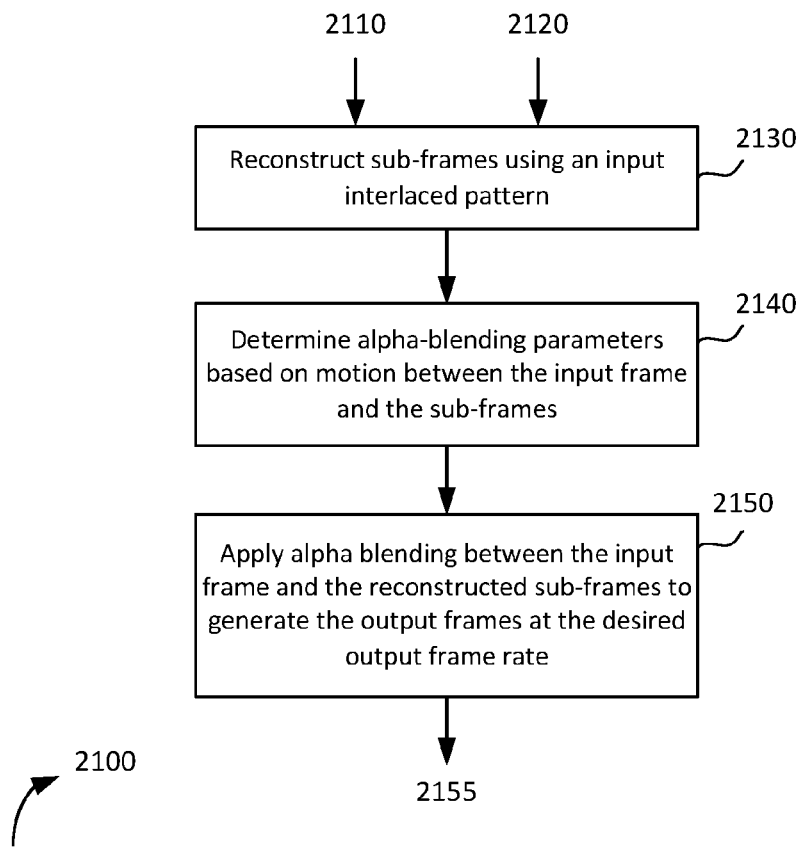
FIG. 21 depicts an example decoder for decoding and reconstructing output frames according to an embodiment of this invention.

FIG. 21 depicts a simplified version of a decoding process (2100) according to another embodiment. As depicted in FIG. 21, a decoder may receive input frames (2110) and associated metadata (2120) such as the interlaced pattern used to construct the input frames, e.g. the temporal offset matrix. In step 2130, for an input frame ($I_{in}$), the receiver may use the S×T interlaced pattern to reconstruct each of the sub-frames ($I_i$, i=1, 2, . . . , S*T). For example, given an m×n input frame, for a 4×4 pattern (e.g., 200), the receiver may reconstruct 16 frames, each of size m/4×n/4. As discussed earlier (e.g., steps 1824-1830), output images (2155) are generated by blending one of the sub-frames with either the input image or another dominant frame.

For example, if $I_\alpha$ denotes a blending, mixing, or mask image with pixel values $\alpha_j$ representing the blending coefficient for the j-th pixel between the input image and each i-th sub-frame, where $0 \le \alpha_j \le 1$, then blending may be expressed as $$I_o^i(j) = *I_{in}(j)*(1-\alpha_j) + I_i(j)*\alpha_j, \qquad (1)$$

where $I_o^i(j)$ denotes the j-th output pixel value for the output frame based on the i-th sub-frame, $I_{in}(j)$ denotes the corresponding pixel in the input or dominant frame, and $I_i(j)$ denotes the corresponding pixel in the i-th sub-frame. As described earlier (e.g., steps 1818-1824), the alpha blending parameters may be proportional to detected motion between the i-th sub-frame and the input frame. For example, if there is a lot of motion, $\alpha_j = 1$, thus, the output image pixels will represent an up-scaled version of pixels in the i-th sub-frame. Up-scaling the i-th sub-frame to full resolution typically causes blurring; however, since there is motion, this blurring will be masked by the motion and will be visually imperceptible. When there is no motion, $\alpha_j = 0$, thus the generated output image will be a copy of the input image, at full resolution, thus reducing blurring due to up-scaling the sub-images. In decoding process (2100), the blending parameters are computed in step (2140). In an embodiment, as an example and without limitation, the blending parameters may be computed by the following process:

Down-sample the full-resolution input frame (2110) to have the same resolution as each sub-frame;

Blur (e.g., using a Gaussian blur filter) the lower-resolution input frame to generate a lower resolution input blurred frame, say, $I_{in}'$. The blur operation compensates for the positional shift of pixels within the sub-frames due to the spatial interlacing;

For each sub-frame, blur using the same blur filter the sub-frame ($I_i$) to generate a blurred sub-frame, say $I_i'$;

Compute the differences (e.g., using an L1 or L2 difference metric, or any other known metric) between pixel values in the blurred $I_{in}'$ and $I_i'$ frames, and determine the alpha blending parameters ($\alpha_j$), based on the differences. For example, if $e_{ij} = |I_{in}(j) - I_i(j)|^2$ denotes the difference between the j-th pixels in the input frame and the i-th sub-frame, then in an embodiment, $\alpha_j$ may be computed as a function of $\max_i (e_{ij})$. Furthermore, as in process (1800), if $\alpha_j$ is lower than a lower threshold, then $\alpha_j$ may be set to 0, and if $\alpha_j$ is higher than an upper threshold, then $\alpha_j$ may be set to 1. The blending parameters computed at the lower resolution may be further processed to generate the final blending image (e.g., $I_\alpha$), at the full (input) resolution.

Given the alpha blending parameters, step (2150) performs the blending (e.g., see equation (1)) and generates the corresponding output image. In some embodiments, blending may be performed on a combination of the sub-images, which are being offset according to the received interlaced pattern. For example, for an input frame rate of 30 fps and a 4×4 pattern, the process described earlier will generate 480 frames per second. If the desired output frame rate is lower, then, before the blending operation, sub-frames may be combined together, for example, using averaging or other interpolation techniques. For example, if the desired output frame rate is 120 fps, every four sub-frames may be combined together to a single super sub-frame, and blending may be performed using the input frame and the super sub-frames. In other embodiments, to reduce computations, extra sub-frames may be skipped completely. Alternatively, blending may be performed at the sub-frame level, but then the output frame rate may be adjusted by either combining output frames generated at full frame rate or skipping frames.

Extending the Exposure Range

In an embodiment, the exposure range of the temporally dithered capture system described earlier can be further extended by embedding an additional very short exposure within the short exposure period of the short-long-short-long repeated sequence of exposures.

The original short-long sequence will typically be separated by just under four "stops" or "exposure values," which corresponds to a numerical factor of 16. E.g., one may pair a $^{15}/_{480}$-th second exposure with a $^{1}/_{480}$-th second exposure. This yields a signal-to-noise ratio or dynamic range increase of about 24 decibels. However, the long-short sequence cannot be easily stretched beyond this because it would introduce excessive noise into moving regions that would be unacceptable. While 24 dB is a good increase, it may not be sufficient to capture the brightest highlights in certain scenes. In an embodiment, one or more even shorter exposures as subintervals in the exposure sequence may be added. In doing this, there is no need to alter the temporal offset dither between adjacent pixels in the sensor matrix. One may simply maintain the timing that is present, while adding sub-exposures that last (for example) $^{1}/_{16}$th as long as the original short exposure. If the original short exposure was $^{1}/_{480}$th of a second, it might become $^{15}/_{7680}$-th, while the new shortest exposure would be $^{1}/_{7680}$-th second. This new shortest exposure would only be used in cases where the $^{15}/_{7680}$-th second exposure overflowed its well (i.e., clipped). The dynamic range would thus be extended another 24 dB over what was available with the long-short sequence, or 48 dB over the long exposure alone.

Figure 20:
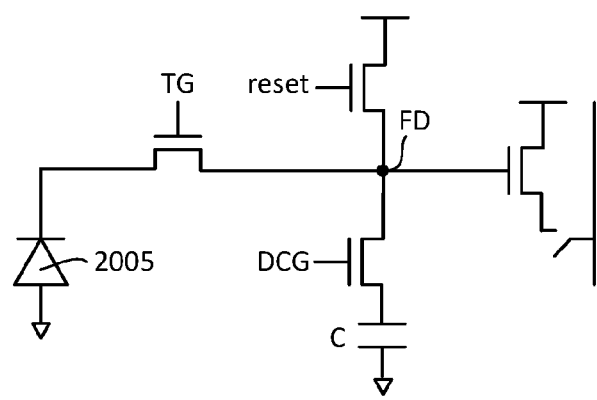
FIG. 20 depicts an example sensor circuit for capturing image data according to an embodiment of this invention.

Alternatively, as depicted in FIG. 20, in a traditional CMOS sensor circuit, within each pixel, one could place an extra capacitor (C) to capture the overflow electrons that would be lost when a transfer occurs from the photodiode (2005) to the source follower amplifier. This method, commonly known as DC-overflow, in an example embodiment, as shown in FIG. 20, requires a capacitor (C) and a single additional gate (DCG). (See also, S. Sugawa, et al., "A 100 dB Dynamic Range CMOS Image Sensor Using a Lateral Overflow integration capacitor," ISSCC Dig. Tech. Paper, p. 352, February 2005, which is incorporated herein by reference.)

In this case, after photo-integration, electrons are transferred to the floating diffusion (FD) region, achieved by opening the gate controlled by signal TG. Simultaneous with opening this gate, a bias voltage is applied to DCG that allows some electrons to transfer to the capacitor, provided the floating diffusion voltage is above that of DCG. In this way, DCG provides a saturation threshold that provides an effectively lower gain for the electrons that are spilled over. If it turns out that the photo-generated electrons do not fill the well, then there will be virtually no "signal" stored on the capacitor. One or two readouts can occur 1) reading the signal stored on the floating diffusion region with the gate DCG closed—if the well was not saturated, this will be the traditional high gain signal; 2) readout of the capacitor, enabled by opening the gate associated with DCG. This readout will be a measure of the overflow electrons, in addition to a small fraction of the below-threshold electrons residing in the FD region. Using this approach, one could avoid another shorter exposure, but this would require possibly another readout from each pixel, plus the added gate and capacitor in the unit cell.

Conceivably, this architecture could also be used to store two different exposures within the unit cell (one on the capacitor followed by a reset of the FD region, the other on the FD region). In this case, the DCG gate would be fully switched on/off in the traditional way, rather than being controlled by a bias voltage.

In another embodiment, another way to shift the exposure range is to subdivide each of the long-short periods, then sum the multiple exposure readouts into a single value per enclosing period. This may add a few dB to the dynamic range, but more importantly avoids overflow without changing the effective exposure time. Thus, continuity for frame rate retargeting is maintained. In a preferred embodiment, the long and short exposure periods should be subdivided by the same divisor, typically into 2, 4, 8, or 16 subintervals that partition the enclosing (long or short) exposure time. There will then occur a corresponding number of readouts, which will be accumulated for each of the long or short exposures into an effective value for each. This technique may be combined with the first method of adding a particularly short exposure to the short period to extend the dynamic range as well as shifting it.

Figure 19:
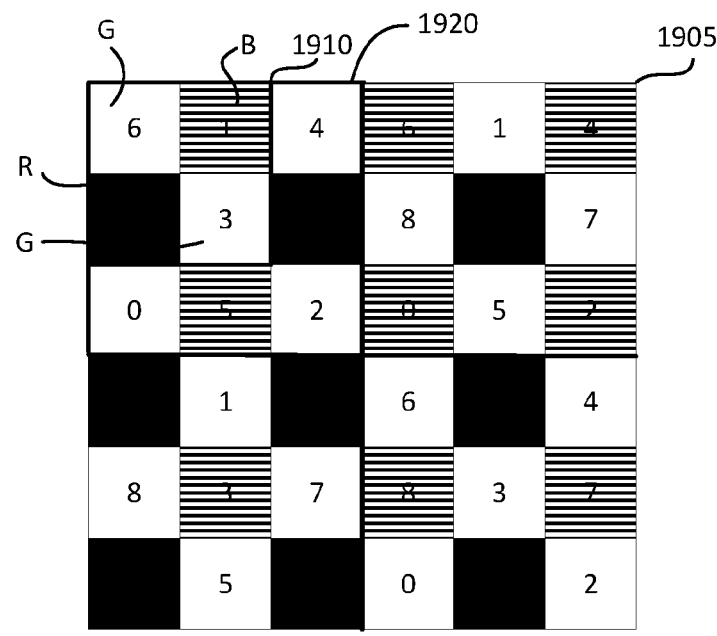
FIG. 19 depicts a 2×2 Bayer pattern combined with a 3×3 temporal offset dither pattern according to an embodiment of this invention.

In a practical, cost-effective, implementation, of the proposed methods, it is of interest to integrate them with commonly-used color filter arrays, such as a repeating Bayer pattern (1905). FIG. 19 illustrates, without limitation, an example of how a repeating 2×2 Bayer pattern (say, the four-pixel G, B, R, G array 1910, where G, B, and R denote Green, Blue, and Red sensors) can be combined with a 3×3 temporal offset dither (say, the 6,1,4, 8,3,7, 0,5,2 array 1920) to achieve a 19 dB increase in dynamic range and a 9× increase in potential frame rate using a long-short-long-short exposure sequence. By overlapping different-sized matrices, one may maintain optimal sampling of both time and color primaries. Combining this with the extra short exposure, the dynamic range can be expanded by another 24 dB using the example described earlier.

A number of embodiments of the invention have been described. It is to be understood that various modifications may be made without departing from the spirit and scope of the invention. For example, some of the steps described above may be order independent, and thus may be performed in an order different from that described. Further, some of the steps described above may be optional. Various activities described with respect to the methods identified above may be executed in repetitive, serial, or parallel fashion. It is to be understood that the foregoing description is intended to illustrate and not to limit the scope of the invention, which is defined by the scope of the following claims, and that other embodiments are within the scope of the claims.

Various aspects of the present invention may be appreciated from the following enumerated example embodiments (EEEs):

EEE 1. An imaging system, comprising:
 a pixel image sensor array disposed on a substrate, said pixel image sensor array comprising a plurality of pixels;
 a multi-stage timer coupled to said pixel image sensor array to trigger at least two exposures of different capture duration of at least one of said plurality of pixels, wherein said at least two exposures are temporally offset;

at least one analog to digital converter coupled to said pixel image sensor array and convert said at least two exposures of said at least one of said plurality of pixels to pixel digital values;

a memory coupled to said at least one analog to digital converter to store said pixel digital values; and a logic circuit coupled to said memory to determine which of said stored pixel digital values to upload to a video frame.

EEE 2. The imaging system of EEE 1, wherein said logic circuit multiplies said stored pixel digital values based upon at least two temporal lengths of the at least two exposures of different capture duration.

EEE 3. The imaging system of EEE 1 or EEE 2, wherein the multi-stage timer is a two stage timer having a first timer sequence and a second timer sequence which is less than one half of a temporal length of the first timer sequence.

EEE 4. The imaging system of EEE 1 or EEE 2, wherein the multi-stage time is a four stage timer having a first timer sequence, a second timer sequence, a third timer sequence and a fourth timer sequence, wherein said first timer sequence and said third timer sequence are approximately equivalent in a temporal length and said second timer sequence and said fourth timer sequence are respectively less than one half the temporal length of said first timer sequence and said third timer sequence.

EEE 5. The imaging system of any of the EEEs 1-4, wherein the upload of said frame is an MPEG standard rate.

EEE 6. The imaging system of any of the EEEs 1-5, wherein the upload of said frame is converted to a unified frame rate.

EEE 7. The imaging system of any of the EEEs 1-6, wherein said logic circuit decides which pixel digital values to upload based on degree of movement estimated by the stored pixel digital values of the at least two exposures of different capture duration.

EEE 8. The imaging system of any of the EEEs 1-6, wherein said logic circuit decides which pixel digital values to upload based on expected eye movement estimated by a location of the stored pixel digital value within the video frame and the stored pixel digital values of the at least two exposures of different capture duration.

EEE 9. The imaging system of any of the EEEs 1-6, wherein said logic circuit decides which pixel digital values to upload based on measured eye movement.

EEE 10. The imaging system of any of the EEEs 1-9, wherein said capture duration is variable based upon an exposure overflow.

EEE 11. An encoder comprising the imaging system of any of the EEEs 1-10.

EEE 12. The imaging system of any of the EEEs 1-10, wherein the upload to said video frame is at least one of rotated, shifted and scrambled and wherein a temporal offset matrix describing the video frame upload is embedded into said video frame.

EEE 13. The imaging system of any of the EEEs 1-10 or EEE 12, wherein said logic correlates said stored pixel digital values to a frame location to pool local pixel digital values and adjusts a noise threshold for a subsequent video frame.

EEE 14. A method of image processing comprising:
receiving a first exposure of a first capture duration from a pixel;
receiving a second exposure of a second capture duration from said pixel, wherein the second capture duration is less than one half of a temporal length of the first capture duration;
converting said first exposure to a first pixel digital value;
converting said second exposure to a second pixel digital value;
multiplying said second pixel digital value based on a ratio of said first capture duration to said second capture duration;
storing the first pixel digital value and the second pixel digital value; and
selecting one of the first pixel digital value and the second pixel digital value to upload to a video frame.

EEE 15. The method of EEE 14, wherein selection is based on degree of movement estimated by the first pixel digital value and the second pixel digital value.

EEE 16. The method of EEE 14, wherein selection is based on expected eye movement estimated by a location of the stored pixel digital value within the video frame and the first pixel digital value and the second pixel digital value.

EEE 17. The method of EEE 14, wherein selection is based on measured eye movement.

EEE 18. An encoder comprising the method of any of the EEEs 14-17.

EEE 19. The method of any of the EEEs 14-17, wherein the upload to said video frame is at least one of rotated, shifted and scrambled and wherein a temporal offset matrix describing the video frame upload is embedded into said video frame.

EEE 20. The method of any of the EEEs 14-19, wherein said selection correlates said stored pixel digital values to a frame location to pool local pixel digital values and adjust a noise threshold for a subsequent video frame.

EEE 21. A method of encoding an image, comprising:
receiving a first pixel digital value of a first capture duration from a pixel;
receiving a second pixel digital value of a second capture duration from said pixel, wherein the second capture duration is less than one half of a temporal length of the first capture duration;
comparing the first pixel digital value to the second pixel digital value to determine a pixel digital delta; and
selecting for upload to a video frame the first pixel digital value if said pixel digital delta is less than a pre-determined noise value.

EEE 22. The method of EEE 21, wherein said second pixel digital value is selected for video frame upload if said pixel digital value is greater than said pre-determined noise value.

EEE 23. The method of EEE 21, wherein said second pixel digital value is selected for video frame upload based on a movement estimation from the pixel digital delta.

EEE 24. The method of EEE 23, further comprising compressing a sub-frame based on said movement estimation.

EEE 25. The method of EEE 21, wherein said second pixel digital value is selected for video frame upload based on an expected eye movement estimated by a location of the pixel within the video frame and the pixel digital delta.

EEE 26. The method of EEE 25, further comprising compressing a sub-frame based on said expected eye movement.

EEE 27. The method of EEE 21 wherein said second pixel digital value is selected for video frame upload based on a measured eye movement.

EEE 28. The method of EEE 27 further comprising compressing a sub-frame based on said measured eye movement.

EEE 29. The method of any of the EEEs 21-28, further comprising integrating the video frame based upon a capture duration of said pixel.

EEE 30. The method of any of the EEEs 21-29, wherein the upload to said video frame is at least one of rotated, shifted and scrambled and wherein a temporal offset matrix describing the video frame upload is embedded into said video frame.

EEE 31. The method of any of the EEEs 21-30, wherein said selection correlates at least one of said first pixel digital value and said second pixel digital value to a frame location to pool local pixel digital values and adjust a noise threshold for a subsequent video frame.

EEE 32. A method of encoding comprising:
receiving a first pixel digital value of a first capture duration from a pixel;
receiving a second pixel digital value of a second capture duration from said pixel, wherein the second capture duration is less than one half of a temporal length of the first capture duration;
multiplying said second pixel digital value based on a ratio of said first capture duration to said second capture duration; and
selecting one of the first pixel digital value and the second pixel digital value to upload to a video frame based in part on a smooth pursuit vector, wherein said smooth pursuit vector is an estimate of viewer visual tracking.

EEE 33. The method of encoding of EEE 32, further comprising storing the first pixel digital value and the second pixel digital value.

EEE 34. The method of encoding of EEE 32 or EEE 33, wherein said smooth pursuit vector is based on a degree of movement estimated by the first pixel digital value and the second pixel digital value.

EEE 35. The method of encoding of any of the EEEs 32-34 wherein said smooth pursuit vector is based on a location of the pixel within said video frame and on a degree of movement estimated by the first pixel digital value and the second pixel digital value.

EEE 36. The method of encoding of any of the EEEs 32-35, wherein said smooth pursuit vector is based on a measured eye movement.

EEE 37. The method of encoding of any of the EEEs 32-36, wherein said smooth pursuit vector is based on a correlation of a degree of movement estimated by the first pixel digital value and the second pixel digital value and a location of the pixel within said video frame.

EEE 38. The method of encoding of any of the EEEs 32-37, wherein the upload to said video frame is at least one of rotated, shifted and scrambled and wherein a temporal offset matrix describing the video frame upload is embedded into said video frame.

EEE 39. The method of encoding of any of the EEEs 32-38, wherein said selection correlates at least one of said first pixel digital value and said second pixel digital value to a frame location to pool local pixel digital values and adjust a noise threshold for a subsequent video frame.

EEE 40. A method of encoding comprising:
receiving a first pixel digital value of a first capture duration from a pixel;
receiving a second pixel digital value of a second capture duration from said pixel, wherein the second capture duration is less than one half of a temporal length of the first capture duration;
converting said first pixel digital value into a first irradiance;
converting said second pixel digital value into a second irradiance;
determining a relative irradiance from subtraction of said first irradiance from said second irradiance; and
selecting the first pixel digital value to upload to a video frame if the absolute value of the relative irradiance is greater than a predetermined threshold.

EEE 41. The method of encoding of EEE 40, further comprising storing the first pixel digital value and the second pixel digital value.

EEE 42. The method of encoding of EEE 40 or EEE 41, wherein the upload to said video frame is at least one of rotated, shifted and scrambled and wherein a temporal offset matrix describing the video frame upload is embedded into said video frame.

EEE 43. The method of encoding of any of the EEEs 40-42, wherein said selection correlates at least one of said first pixel digital value and said second pixel digital value to a frame location to pool local pixel digital values and adjust a noise threshold for a subsequent video frame.

EEE 44. A method of encoding comprising:
receiving a first pixel digital value of a first capture duration from a pixel;
receiving a second pixel digital value of a second capture duration from said pixel, wherein the second capture duration is less than one half of a temporal length of the first capture duration;
converting said first pixel digital value into a first irradiance;
converting said second pixel digital value into a second irradiance;
determining a relative irradiance from subtraction of said first irradiance from said second irradiance;
mixing the first pixel digital value and the second pixel digital value to form a mixed pixel digital value based on the first irradiance and the second irradiance if the relative irradiance is less than a predetermined threshold; and
selecting the mixed pixel digital value to upload to a video frame.

EEE 45. The method of encoding of EEE 44, further comprising storing the first pixel digital value and the second pixel digital value.

EEE 46. The method of encoding of EEE 44 or EEE 45, wherein the upload to said video frame is at least one of rotated, shifted and scrambled and wherein a temporal offset matrix describing the video frame upload is embedded into said video frame.

EEE 47. The method of encoding of any of the EEEs 44-46, wherein said selection correlates at least one of said first pixel digital value and said second pixel digital value to a frame location to pool local pixel digital values and adjust a noise threshold for a subsequent video frame.

EEE 48. The method of encoding of any of the EEEs 44-47, further comprising:
receiving a third pixel digital value of a third capture duration from said pixel, wherein the third capture duration is smaller than the temporal length of the second capture duration;
converting said third pixel digital value into a third irradiance; and
upon determining that the second pixel digital value is overflowed or clipped, performing the mixing using the third pixel digital value and the third irradiance instead of using the second pixel digital value and the second irradiance.

EEE 49. A method of decoding a temporally offset frame, the method comprising:
interpolating a set of Q frames spatially utilizing a set of temporal offset matrix positions corresponding to a target output interval;

averaging the Q interpolated frames to form a motion image frame;

down-sample matching a spatial resolution of each of the Q interpolated frames to form a down-sample matched frame;

down-sample averaging a set of Q original frames utilizing the down-sample matched spatial resolution to form a down-sample averaged frame;

determining a set of squared difference values between the down-sample matched frame and the down-sample averaged frame;

summing the set of squared difference values to form a summed squared difference frame;

up-sampling the summed squared difference frame;

resetting the up-sampled summed squared difference values above a predetermined upper threshold to one and below a predetermined lower threshold to zero;

determining a mixing image utilizing the reset summed squared difference values;

selecting a dominant frame that corresponds to a maximum-overlap with the target output interval; and combining the selected dominant frame with the motion image frame based on the mixing image to form an output frame.

EEE 50. The method of decoding of EEE 49, further comprising repeating the method for channels having similar frame sequential colors.

The invention claimed is:

1. An imaging system, comprising:
a pixel image sensor array disposed on a substrate, said pixel image sensor array comprising a plurality of pixels;
a multi-stage timer coupled to said pixel image sensor array for triggering exposures of said plurality of pixels, wherein the pixels are grouped into N subsets, and the multi-stage timer is configured to trigger, for each of the N subsets, an exposure sequence of at least two exposures of different capture duration of the pixels of said subset, wherein start times of the exposure sequences of the different subsets are temporally offset by a predetermined offset $t_{offset}$, and the exposure sequences have the same overall duration T and the predetermined temporal offset $t_{offset}$ is smaller than said overall duration T such that the exposure sequences of the different subsets overlap in time;
at least one analog to digital converter coupled to said pixel image sensor array and configured to convert said at least two exposures of said plurality of pixels of the subsets to pixel digital values;
a memory coupled to said at least one analog to digital converter and configured to store said pixel digital values; and
a logic circuit coupled to said memory and configured to determine for each pixel of the image sensor array which of the corresponding stored pixel digital values to upload to a video frame;
wherein each pixel of said pixel image sensor array is assigned to one of the N subsets according to a temporal offset matrix comprising N elements, wherein the temporal offset matrix tiles the pixel image sensor array.

2. The imaging system of claim 1, wherein the temporal offset matrix assigns the pixels to the subsets in such a manner that any two horizontally adjacent pixels and any two vertically adjacent pixels of the pixel image sensor array are not immediately following each other in the predetermined order in which the exposure sequences are triggered.

3. The imaging system of claim 1, wherein the temporal offset matrix is embedded into said video frame.

4. The imaging system of claim 1, wherein the predetermined offset $t_{offset}$ is equal to the overall duration T divided by N.

5. The imaging system of claim 1, wherein the upload of said frame is an MPEG standard rate.

6. The imaging system of claim 1, wherein the upload of said frame is converted to a unified frame rate.

7. The imaging system of claim 1, wherein said logic circuit is configured to determine for each pixel, which of the pixel digital values to upload based on a degree of movement estimated on the basis of the stored pixel digital values of the at least two exposures of different capture duration.

8. The imaging system of claim 7, wherein each exposure sequence comprises a first exposure having a first capture duration and a second exposure having a second capture duration that is smaller than the first capture duration, wherein said logic circuit, for each pixel:
scales the corresponding pixel digital value of the second exposure of said pixel or the corresponding pixel digital value of the first exposure of said pixel, according to the ratio of the duration of said second exposure to the duration of said first exposure; and
determines the difference between the scaled pixel digital value of the second exposure and the pixel digital value of the first exposure or the difference between the scaled pixel digital value of the first exposure and the pixel digital value of the second exposure, and selects the digital value of the second exposure for upload to the video frame if said difference exceeds a predetermined threshold.

9. The imaging system of claim 8, wherein each exposure sequence further comprises a third exposure having a third capture duration that is smaller than the second capture duration, and the logic circuit is configured to select the digital value of the third capture duration upon determining that the pixel digital value of the second exposure is overflowed or clipped.

10. The imaging system of claim 1, wherein said logic circuit determines for each pixel of the pixel image sensor array which of the pixel digital values to upload based on expected eye movement of viewers, estimated on the basis of a location of said pixel within the video frame and the corresponding stored pixel digital values of the at least two exposures of different capture duration, wherein optionally said logic circuit determines for each pixel of the pixel image sensor array which of the pixel digital values to upload based on eye-tracking measurements of test viewers.

11. The imaging system of claim 1, wherein said logic correlates said stored pixel digital values with a frame location to pool local pixel digital values and adjusts a noise threshold for a subsequent video frame.

12. A method of imaging, comprising:
triggering an exposure sequence of at least two exposures of different capture duration of the pixels of each of N subsets of a plurality of pixels of a pixel image sensor array, wherein the exposure sequences are triggered in a predetermined order, wherein start times of the exposure sequences of the different subsets are temporally offset by a predetermined offset $t_{offset}$, and the exposure sequences have the same overall duration T and the predetermined temporal offset $t_{offset}$ is smaller than said overall duration T such that the exposure sequences of the different subsets overlap in time;

converting said at least two exposures of said plurality of pixels of the subsets to pixel digital values;

determining for each pixel of the pixel image sensor array which of the corresponding stored pixel digital values to upload to a video frame; and uploading the determined stored pixel digital value to the video frame;

wherein each pixel of said pixel image sensor array is assigned to one of the N subsets according to a temporal offset matrix comprising N elements, wherein the temporal offset matrix tiles the pixel image sensor array.

13. A method of encoding, comprising:

receiving a first pixel digital value of a first exposure of a pixel, the first exposure having a first capture duration;

receiving a second pixel digital value of a second exposure of the pixel, the second exposure having a second capture duration that is smaller than the first capture duration and a start time temporally offset from the first capture duration by a predetermined temporal offset smaller than the duration of the first exposure;

comparing the first pixel digital value to the second pixel digital value to determine a pixel digital delta; and selecting for upload to a video frame the first pixel digital value if said pixel digital delta is less than a predetermined threshold, wherein the predetermined threshold is determined by a blurred bitmap of pixels from a short exposure in a previous frame.

14. An encoder configured to implement the method of claim 13.

15. A non-transitory computer-readable storage medium having stored thereon computer-executable instruction for executing a method in accordance with claim 13.

16. The method of claim 13, further comprising assigning the first pixel digital value to one of N subsets according to a temporal offset matrix comprising N elements, wherein the temporal offset matrix tiles a pixel image sensor array.

* * * * *